US007144637B2

(12) United States Patent
Thomae

(10) Patent No.: US 7,144,637 B2
(45) Date of Patent: Dec. 5, 2006

(54) MULTILAYER, CORROSION-RESISTANT FINISH AND METHOD

(76) Inventor: Kurt J. Thomae, 500 Eagle Dr., #105, Elk Grove Village, IL (US) 60007

( * ) Notice: Subject to any disclaimer, the term of this patent is extended or adjusted under 35 U.S.C. 154(b) by 0 days.

(21) Appl. No.: 10/889,594

(22) Filed: Jul. 12, 2004

(65) Prior Publication Data

US 2006/0008668 A1 Jan. 12, 2006

(51) Int. Cl.
*B32B 15/04* (2006.01)
*C25D 3/56* (2006.01)

(52) U.S. Cl. ...................... 428/626; 428/659; 428/632; 428/935; 205/217; 205/245; 205/318; 205/196; 148/253; 427/406

(58) Field of Classification Search ................ 428/626, 428/628, 658, 659, 421, 422, 472.3, 935; 148/253, 254; 205/244, 245, 309
See application file for complete search history.

(56) References Cited

U.S. PATENT DOCUMENTS

| | | | | |
|---|---|---|---|---|
| 4,009,093 | A | 2/1977 | Luch | |
| 4,093,522 | A | 6/1978 | Dillenberg | |
| 4,141,803 | A | 2/1979 | Barclay et al. | |
| 4,392,920 | A | 7/1983 | McDonald | |
| 4,429,020 | A | 1/1984 | Luch | |
| 4,472,249 | A | 9/1984 | Chessin | |
| 4,543,300 | A * | 9/1985 | Hara et al. | 428/610 |
| 4,603,092 | A | 7/1986 | Luch | |
| 4,608,130 | A | 8/1986 | Shimizu et al. | |
| 4,629,659 | A * | 12/1986 | Kyono et al. | 428/659 |
| 4,643,952 | A | 2/1987 | Kurakata | |
| 4,720,400 | A | 1/1988 | Manniso | |
| 4,835,066 | A * | 5/1989 | Taisuke et al. | 428/659 |
| 4,968,391 | A | 11/1990 | Saito et al. | |
| 4,984,855 | A | 1/1991 | Horiuti et al. | |
| 5,023,146 | A | 6/1991 | Saito et al. | |
| 5,067,990 | A * | 11/1991 | Ribitch | 148/254 |
| 5,074,957 | A | 12/1991 | Horiuti et al. | |
| 5,082,748 | A * | 1/1992 | Ahn et al. | 428/656 |
| 5,225,067 | A * | 7/1993 | Sagiyama et al. | 205/152 |
| 5,236,574 | A * | 8/1993 | Oshima et al. | 205/138 |
| 5,240,783 | A * | 8/1993 | Kurimoto et al. | 428/659 |
| 5,271,823 | A | 12/1993 | Schachameyer et al. | |

(Continued)

OTHER PUBLICATIONS

Coating World, Detroit's Big Three All Specify Xylan 5230, New Chromium-Free Fastener-Class Coating, vol. II, Oct. 2002, 2 pages.*

*Primary Examiner*—John J. Zimmerman
(74) *Attorney, Agent, or Firm*—Meroni & Meroni, P.C.; Charles F. Meroni, Jr.; Christopher J. Scott

(57) ABSTRACT

The present invention provides a black, chrome-free, multilayer corrosion protection finish designed to meet extended corrosion properties. This corrosion-resistant finish is engineered to meet a minimum of 500 salt spray testing hours to white corrosion, and 1500 salt spray testing hours to red corrosion when tested to ASTM B117 standards. It is also designed to comply with the European Union Directive on End of Life Vehicles. This multilayer system is designed for use on automotive body sheet steel, automotive underbody parts, automotive under-hood parts, and some automotive interior parts specifying a gloss requirement greater than 4. This chrome-free, multilayer finish is a combination of a zinc-iron electroplated substrate, a non-electrolytic phosphate crystal conversion layer using orthophosphoric acid, and a Xylan/Teflon fluorocarbon sealer coating to form a three layer total corrosion protection system.

27 Claims, 11 Drawing Sheets

U.S. PATENT DOCUMENTS

| | | | | |
|---|---|---|---|---|
| 5,316,652 | A * | 5/1994 | Sagiyama et al. | 205/177 |
| 5,429,881 | A * | 7/1995 | Aono et al. | 428/632 |
| 5,435,898 | A * | 7/1995 | Commander et al. | 205/245 |
| 5,565,042 | A | 10/1996 | Sakurai et al. | |
| 5,714,047 | A * | 2/1998 | Pedrazzini | 204/486 |
| 5,867,883 | A * | 2/1999 | Iorio et al. | 29/460 |
| 5,876,517 | A | 3/1999 | Jeannier | |
| 5,885,373 | A * | 3/1999 | Sienkowski | 148/247 |
| 6,146,021 | A | 11/2000 | Ward | |
| 6,318,898 | B1 | 11/2001 | Ward et al. | |
| 6,417,292 | B1 * | 7/2002 | Moriarity et al. | 525/440 |
| 6,500,886 | B1 | 12/2002 | Yamamuro et al. | |
| 6,562,474 | B1 | 5/2003 | Yoshimi et al. | |
| 6,720,032 | B1 * | 4/2004 | Kuhm et al. | 427/327 |
| 2001/0001965 | A1 | 5/2001 | Miyoshi et al. | |
| 2002/0000379 | A1 | 1/2002 | Matsuda et al. | |

* cited by examiner

Phosphating solution:
Orthophosphoric Acid: $H_3PO_4$
FIGURE No. 1
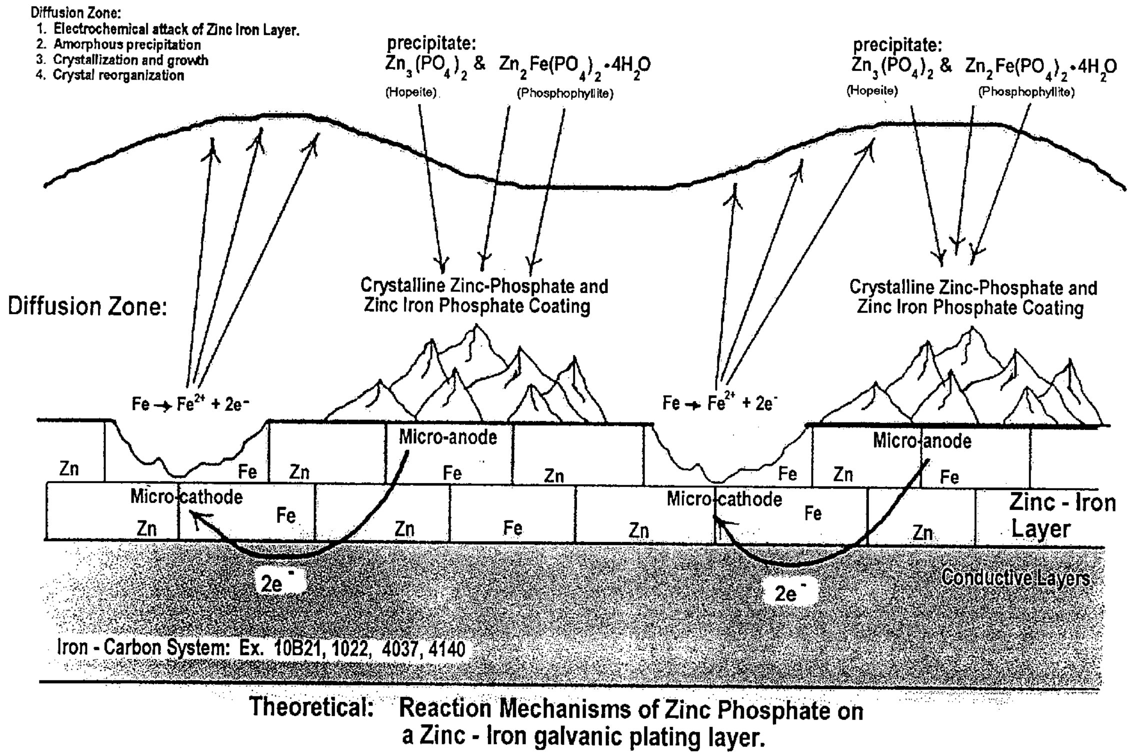
Theoretical: Reaction Mechanisms of Zinc Phosphate on a Zinc - Iron galvanic plating layer.

FIGURE No. 2
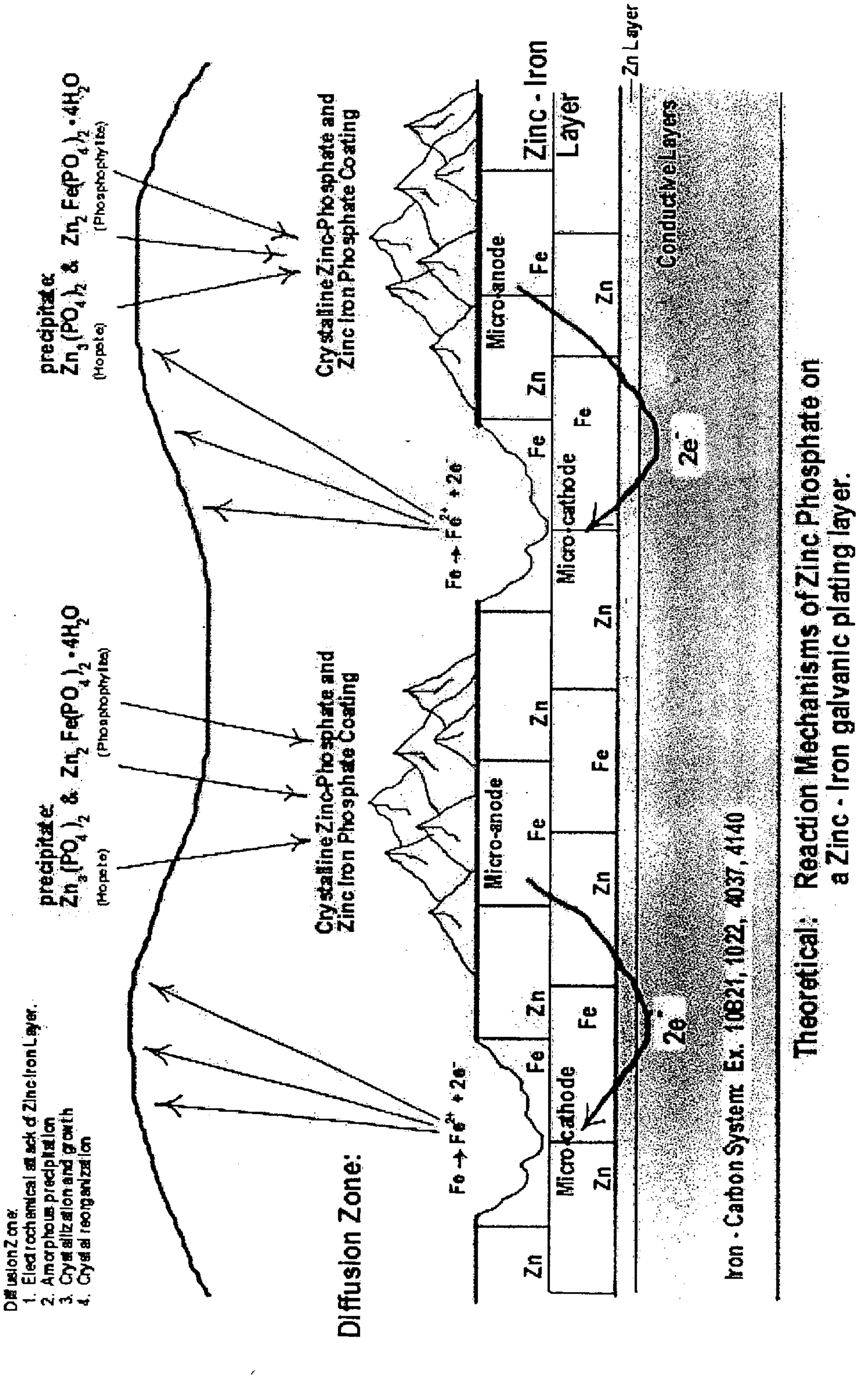

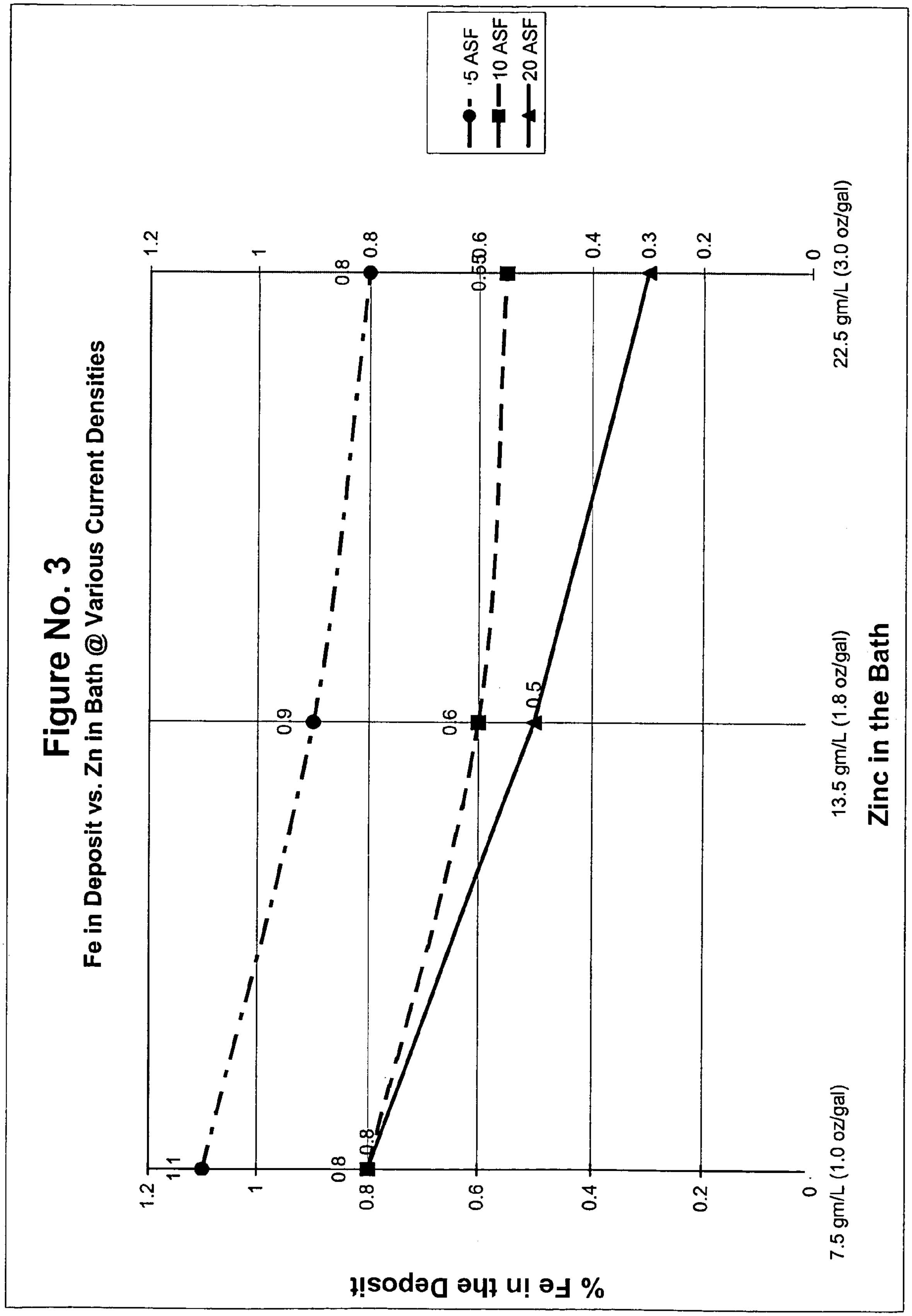
Figure No. 3
Fe in Deposit vs. Zn in Bath @ Various Current Densities
5 ASF
10 ASF
20 ASF
% Fe in the Deposit
Zinc in the Bath
7.5 gm/L (1.0 oz/gal)
13.5 gm/L (1.8 oz/gal)
22.5 gm/L (3.0 oz/gal)
0
0.2
0.4
0.6
0.8
1
1.2
1.1
0.9
0.5
0.3
0.55

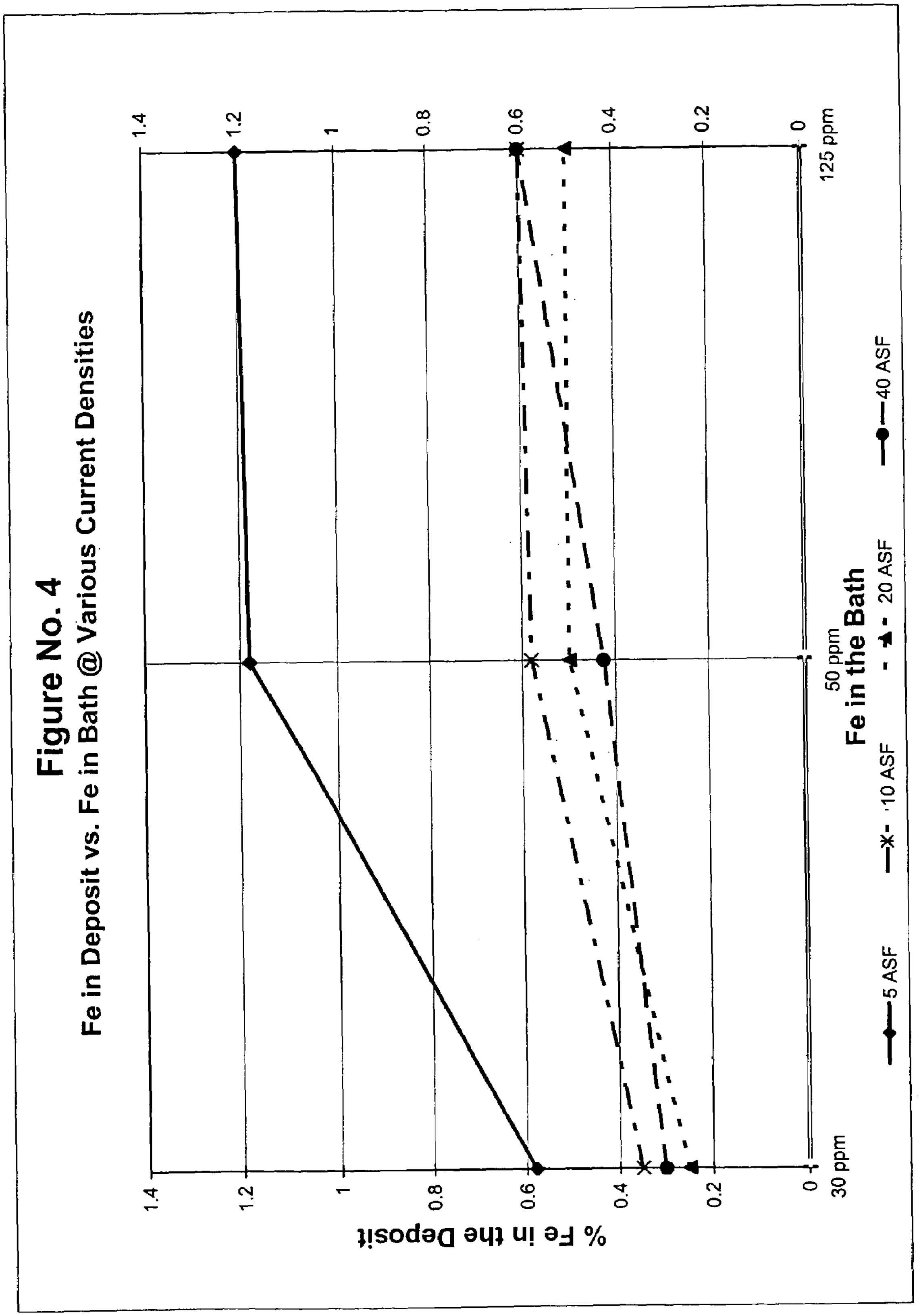
Figure No. 4
Fe in Deposit vs. Fe in Bath @ Various Current Densities
% Fe in the Deposit
Fe in the Bath
30 ppm
50 ppm
125 ppm
0
0.2
0.4
0.6
0.8
1
1.2
1.4
5 ASF
10 ASF
20 ASF
40 ASF

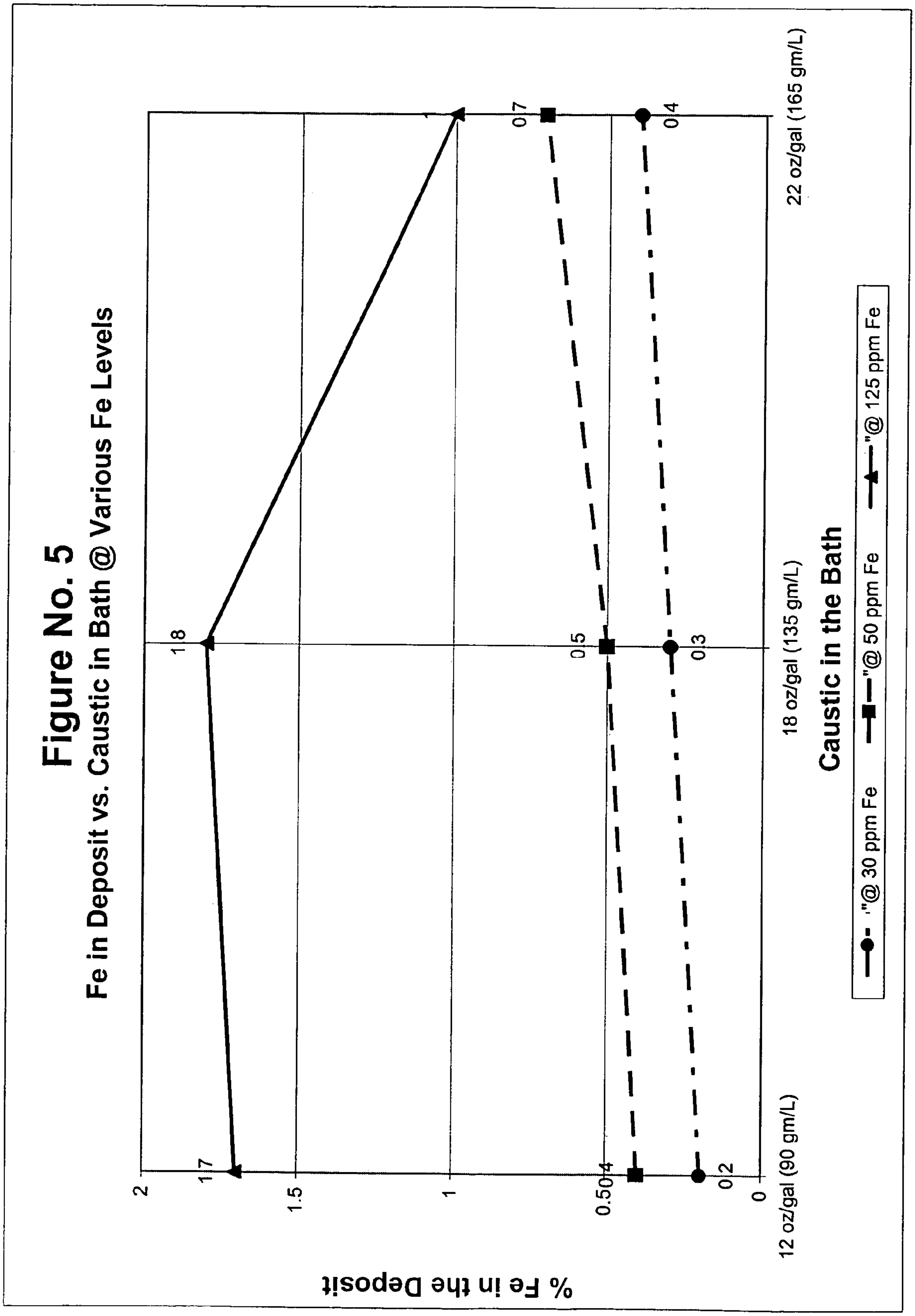
Figure No. 5
Fe in Deposit vs. Caustic in Bath @ Various Fe Levels
% Fe in the Deposit
2
1.5
1
0.5
0
12 oz/gal (90 gm/L)
18 oz/gal (135 gm/L)
22 oz/gal (165 gm/L)
Caustic in the Bath
"@ 30 ppm Fe
"@ 50 ppm Fe
"@ 125 ppm Fe

Figure No. 6
Fe in Deposit vs. Temperature @ Various Fe Levels
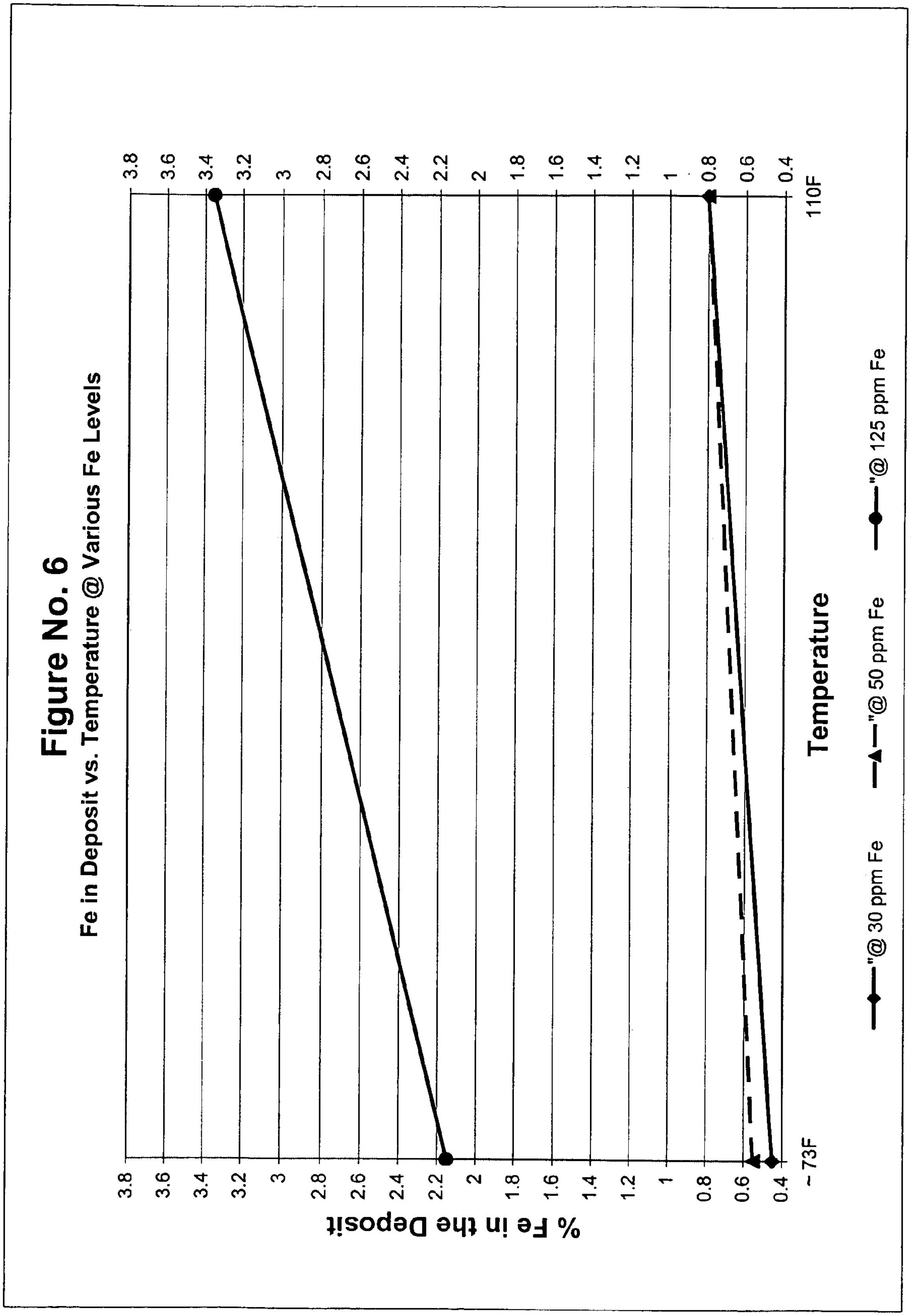

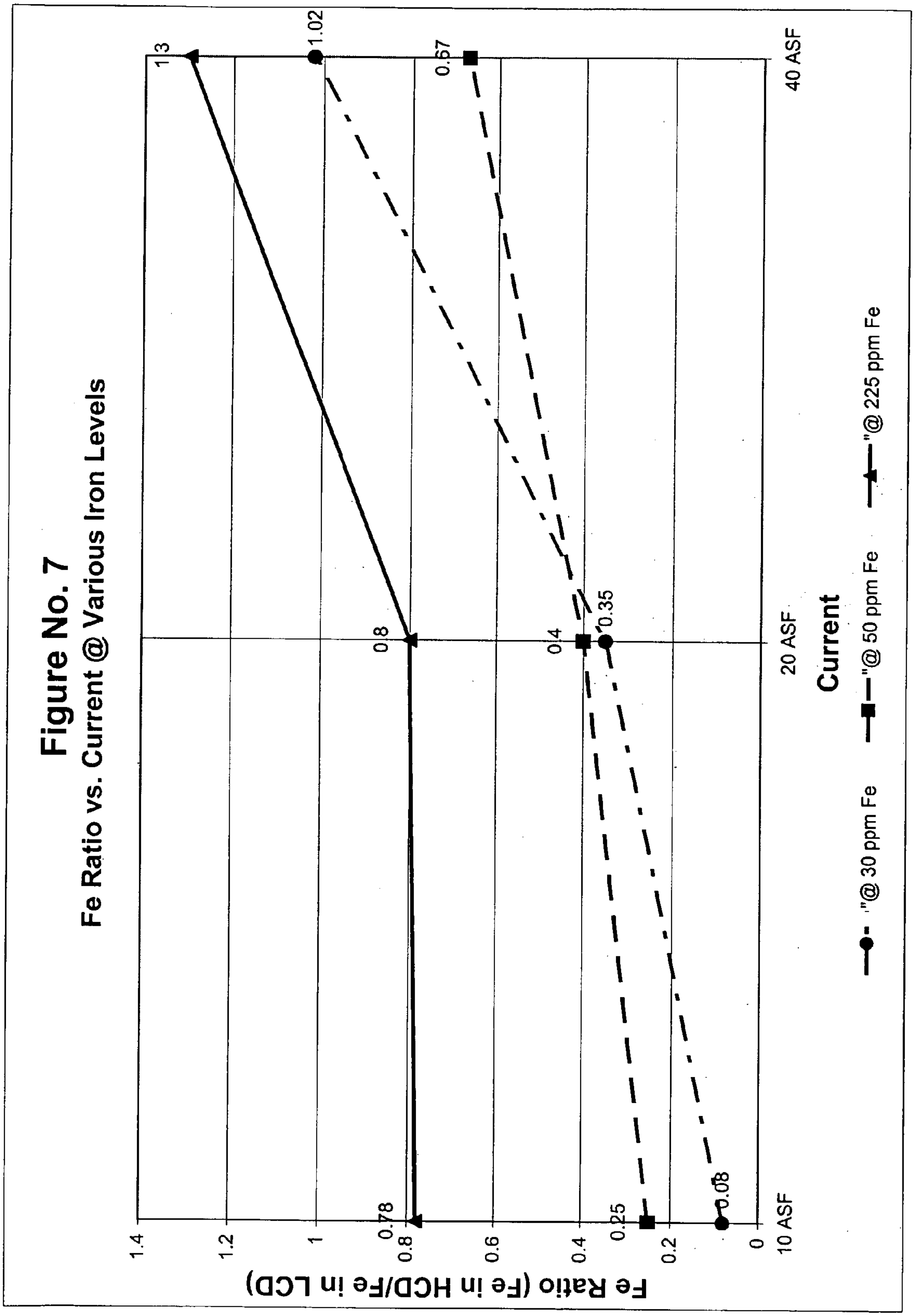
Figure No. 7
Fe Ratio vs. Current @ Various Iron Levels
Fe Ratio (Fe in HCD/Fe in LCD)
1.4
1.2
1
0.8
0.6
0.4
0.2
0
10 ASF
20 ASF
40 ASF
Current
0.78
0.25
0.08
0.8
0.4
0.35
1.3
1.02
0.67
"@ 30 ppm Fe
"@ 50 ppm Fe
"@ 225 ppm Fe Efficiency vs. Current Graph Chart 1
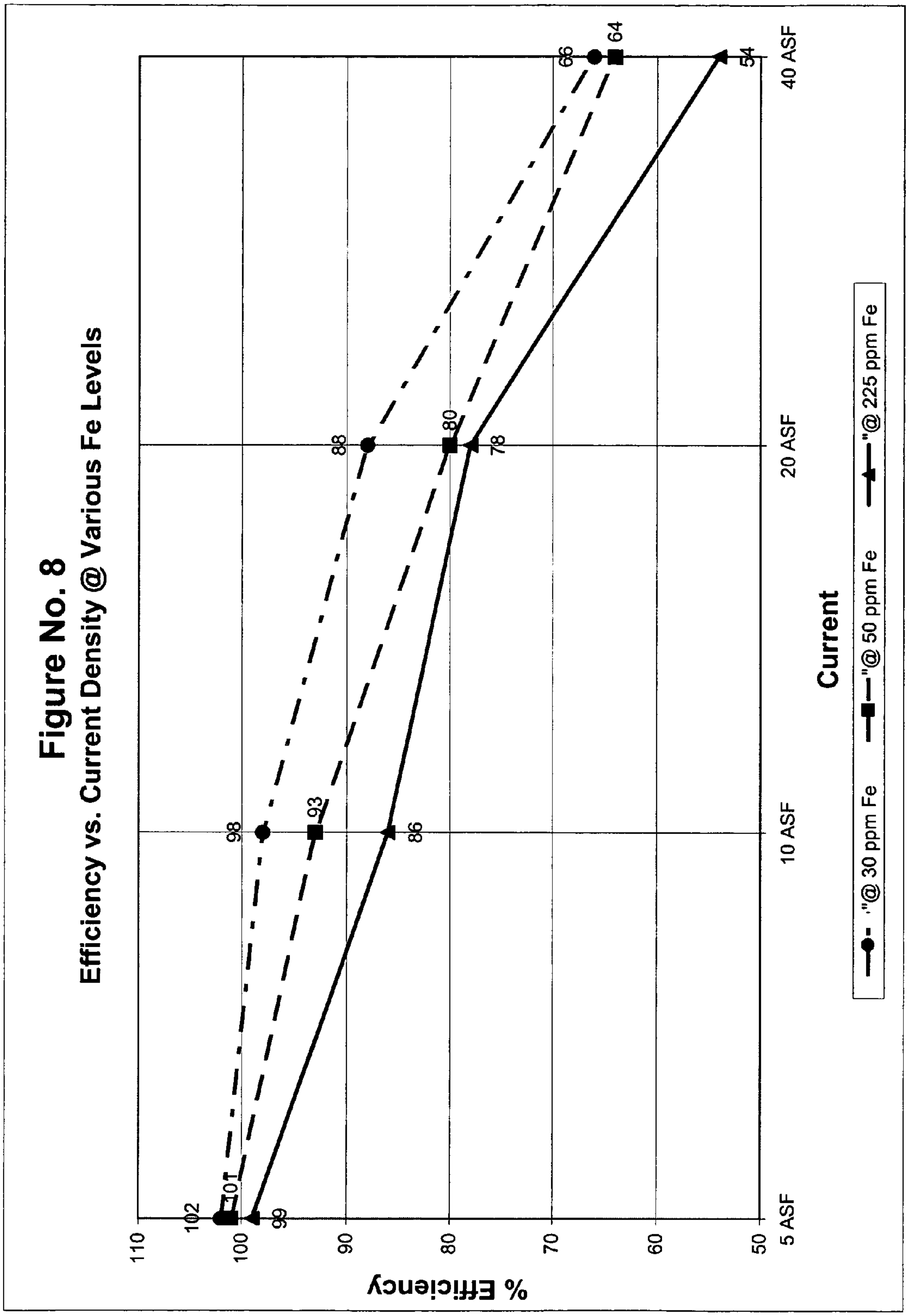

Hull Cell Scale
| | | | | | | | | | | | | | | | | |
|---|---|---|---|---|---|---|---|---|---|---|---|---|---|---|---|---|
| 1 amp | ← Panel Edge | 40 | 30 | 25 | 20 | 15 | 12 | 10 | 8 | 6 | 4 | 3 | 2 | 1 | 0.5 |
| 2 amps | | 80 | 60 | 50 | 40 | 30 | 24 | 20 | 16 | 12 | 8 | 6 | 4 | 2 | 1 |
| ↕ Total Current | Amps/Sq. Ft. - 267 mL Hull Cell<br>2 g/267 mL Hull Cell = 1 oz/gal = 6.25 lbs/100 gal or 7.5 g/L<br>1 mL/267 mL Hull Cell = 0.48 Fl.Oz./Gal. = 3 pts./100 gal | | | | | | | | | | | | | | |
| 3 amps | | 120 | 90 | 75 | 60 | 45 | 36 | 30 | 24 | 18 | 12 | 9 | 6 | 3 | 1.5 |
| 5 amps | | 200 | 150 | 125 | 100 | 75 | 60 | 50 | 40 | 30 | 20 | 15 | 10 | 5 | 2.5 |
Figure No. 9(a)
HULL CELL TEST - 267 ml Hull Cell
Agitation - Mechanical or Air
Temperature - Operating Temperature
Current & Time - 1 amp/ 15 minutes
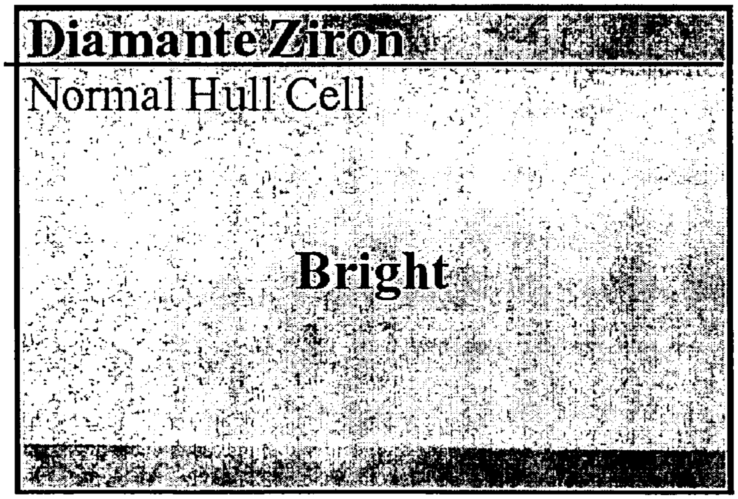
Normal
Figure No. 9(b)

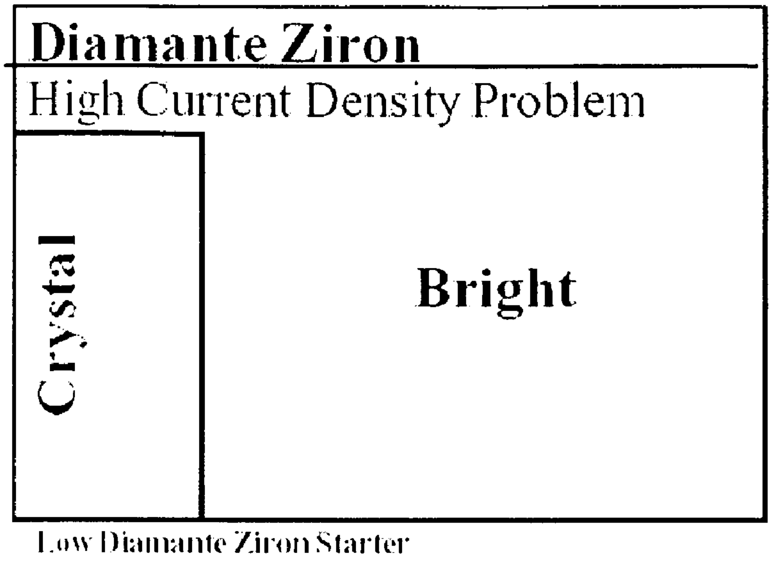
Figure No. 10
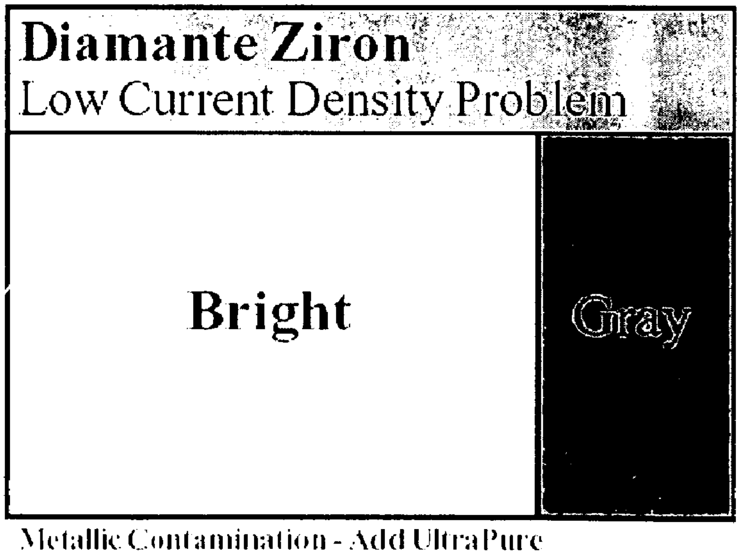
Figure No. 11

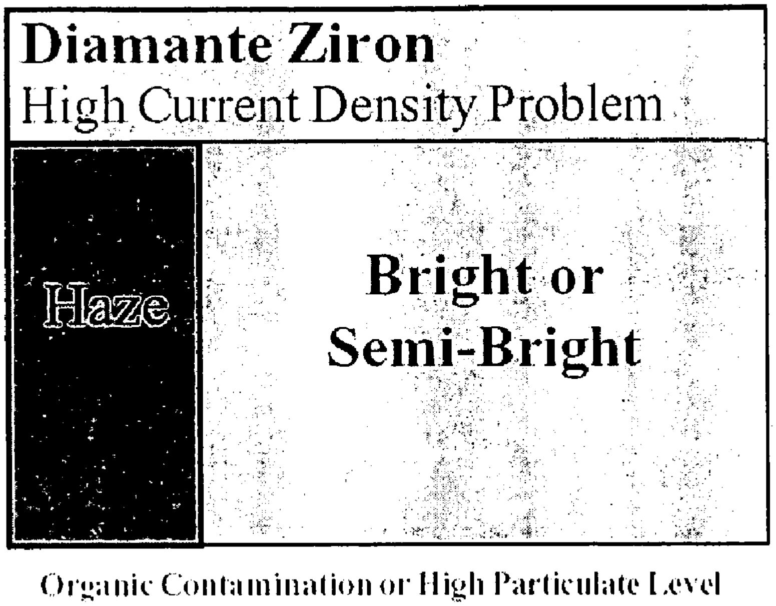
Figure No. 12
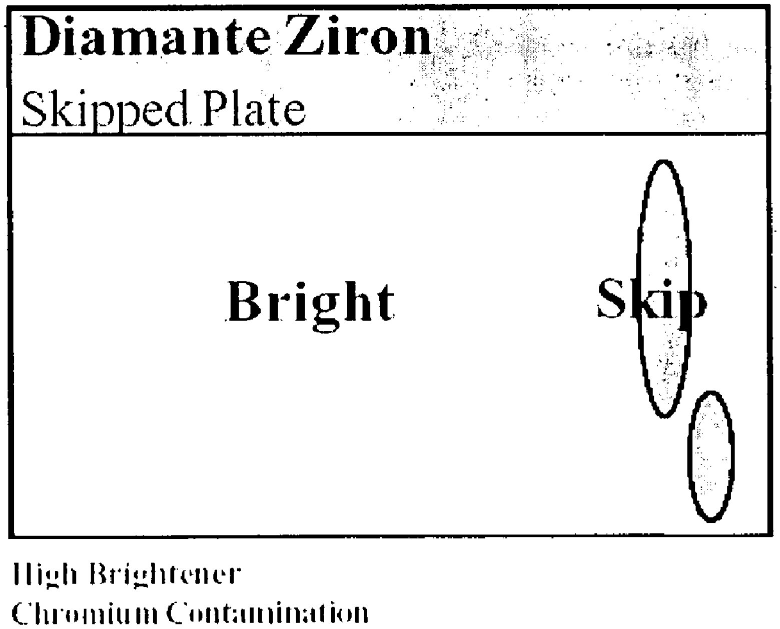
Figure No. 13

MULTILAYER, CORROSION-RESISTANT FINISH AND METHOD

BACKGROUND OF THE INVENTION

1. Field of the Invention

The present invention generally relates to an anti-corrosion or corrosion-resistant finish and method(s) of forming the finish. More particularly, the present invention relates to a corrosion-resistant finish primarily for use in automobile applications, which finish comprises multiple layers, including a zinc-iron substrate layer, a phosphate crystal conversion layer, and a fluorocarbon sealer coat layer.

2. Description of the Prior Art

In their 1996 article, "Alternative to Hexavalent Chrome," the Institute of Manufacturing Sciences wrote, as follows: "Fugitive air emissions, water emissions from poorly treated rinse water, and solid waste generated from hexavalent chromium processes can have a detrimental impact on the environment. This impact can be eliminated or reduced if a cleaner technology is used." In response to this article, the European Union and the European Communities wrote two directives.

The first directive (European Union Directive on End of Life Vehicles COM(97) 0358-C4-0639/97-97/0194(SYN), Sep. 18, 2000, "2000/53/EC and Draft: Amending Annex II of Directive 2000/53/EC", (1) The reuse/recovery of End of Life Vehicles (ELV's) to reach 85% by weight per vehicle by 2006 and 95% by 2015, and (2) The reuse/recycling of ELV's to reach 80% by weight per vehicle by 2006 and 85% by 2015) was a legislative attempt to reduce the amount of ELV waste that is land filled or incinerated without energy recovery. This legislation was enacted in response to findings that showed ELV shredding residue comprises approximately 60% of the total shredding residues in Europe. It is thus generally accepted that reducing the amount of hazardous shredding residue from ELV's will have a positive impact on the environment.

The second directive (European Communities Directive: 67/548/EEC) attempts to regulate the classification, packaging, and labeling of hexavalent chromium and other dangerous substances. In the United Kingdom and Japan, for example, Cr+6 compounds are identified as Category 1 carcinogens. The governments of both the United Kingdom and Japan thus require facilities utilizing products containing hexavalent chromium compounds to implement reduction and elimination programs.

The North American auto manufacturers have responded to the directives from overseas by writing new "Restrictive and Reportable Substances" specifications. The projected implementation dates for the new global standards (i.e. the projected implementation dates for the elimination of hexavalent chrome (Cr+6) from vehicles) as adopted by the major North American automobile manufacturers and as prompted by the European Union Directives, are as follows:

General Motors:

GMW3059 Implementation on Model Year 2006

Exception: Opal and Saab Divisions: Implementation on calendar date Jan. 1, 2005

Daimler Chrysler:

Hexavalent Systems will no longer be allowed or covered under Daimler Chrysler Process Standards beginning Jan. 1, 2007. On this date, all systems shall be converted to Trivalent Chromium processes ONLY.

Ford Body & Chassis: & Visteon/Ford:

Ford Motor WSS-M9P99999-A1 (known as the Hex 9 spec.)

Implementation on calendar date Jul. 31, 2005

Delphi Automotive:

DX000001: Implementation on calendar date Jan. 1, 2007

However, PPAPs in March and April of 2006 will implement DX000001

Nissan:

NES M 0301: Implementation on calendar date Jul. 1, 2003

Toyota:

Spec. # is currently under evaluation: Implementation on calendar date Jul. 1, 2007

European Union Directives

COM(97) 0358-C4-0639/97-97/0194(SYN) 67/548/EEC (2000/53/EC)

Draft: Amending Annex II of Directive 2000/53/EC

Implementation on calendar date Jul. 1, 2007

Since the first inception of these directives one of the challenges in the automotive industry has been to develop a hexavalent chrome-free, or a totally chrome-free, black, corrosion finish that can withstand extended corrosion testing. Thus, the premise of the present invention is to provide a plating or coating system that meets the specified criteria. Some of the more pertinent requirements of a plating or coating system are that the plating/coating (1) must be black; (2) must be Cr (VI) free (Hexavalent Chrome Free), or totally chrome-free; (3) must be able to withstand a minimum of 1500 hrs salt spray testing to red corrosion; (4) must be able to withstand a minimum of 500 hrs salt spray testing to white corrosion; (5) must have a lubricity factor or coefficient of friction (k<0.13) (in particular, no squeaking can occur in plastic molded assemblies); (6) must be able to withstand injection molding temperatures of 700–750° F. (371–399° C.) for an intermittent cycle time of 10–30 seconds. And a continuous service temperature range of 450–550° F. (371–399° C.) with no breakdown in its corrosion properties; and (7) must not fill in the head recesses or threads of the fasteners.

The fastener industry applies corrosion protection systems to approximately 90% of its manufactured product. In general the main type of corrosion protection system used on fasteners is an electrogalvanizing deposit of zinc followed by a sealing polymeric sheath or envelope (chromates). The salt spray protection to red corrosion in these types of systems ranges from 48 to 168 hours. With the inception of the automotive directives many of the new corrosion systems in the industry have turned to trivalent (CrIII) chromates, and top coat sealers.

One of the ways to significantly improve corrosion resistance in an electroplating system is to adjoin a heavy metal atom to the zinc (iron-carbon) galvanic process. The three most common zinc alloying metals are cobalt, nickel, and iron. In theory the tiny additions of these alloying elements prevent, or delay the startup of intergranular corrosion of the zinc. The results are that red corrosion resistance is increased to 425 hours and up to 1000 hours in these plating systems. Many of these plating systems however, have hexavalent chromium in their top chromate sealers.

For this design premise the metal atom group of most interest is the zinc-iron plating system. This system will provide a proper substrate layer for the attachment of a heat barrier coating layer. An additional fluorocarbon top sealer will provide the desired coefficient of friction requirement, and complete the total corrosion protection system.

For purposes of comparison the reader is directed to U.S. Pat. No. 6,318,898 ('898 Patent), which issued to Ward et al. The '898 Patent discloses a Corrosion-Resistant Bearing and Method for Making Same and thus teaches a corrosion-resistant antifriction bearing that includes a multi-layer corrosion protection system over a metallic substrate. The corrosion-resistant system may be applied to a single or multiple components of the bearing, including inner and outer rings, bearing elements, collars, and so forth. The system includes a nickel-phosphorous alloy plating layer applied by an autocatalytic process after surface preparation of the protected component. The surface preparation aids in adherence of the nickel-phosphorous alloy plating layer to the substrate. The preparation may include the application of rust inhibitors, liquid vapor honing, acid neutralizing, and so forth. Additional top coat layers may be applied to the nickel-phosphorous allow plating layer. These may include a chromate conversion coating and a polymeric top coat layer. The polymeric top coat layer may include polytetrafluoroethylene. U.S. Pat. No. 6,146,021 ('021 Patent), also issued to Ward, teaches related subject matter to the '898 Patent.

The reader is further directed to U.S. Pat. No. 6,562,474 ('474 Patent), which issued to Yoshimi et al. The '474 Patent discloses a Coated Steel Sheet having Excellent Corrosion Resistance and Method for Producing the Same. The '474 Patent teaches a coated steel sheet having excellent corrosion resistance comprises: a zinc or a zinc alloy plated steel sheet or an aluminum or an aluminum alloy plated steel sheet; a composite oxide coating formed on the surface of the plated steel sheet; and an organic coating formed on the composite oxide coating. The composite oxide coating contains a fine particle oxide and a phosphoric acid and/or a phosphoric acid compound. The organic coating has thickness of from 0.1 to 5 .mu.m. Notably, the organic coating may, at need, further include a solid lubricant (c) to improve the workability of the coating. Examples of applicable solid lubricant according to the present invention are the following. (1) Polyolefin wax, paraffin wax: for example, polyethylene wax, synthetic paraffin, natural paraffin, microwax, chlorinated hydrocarbon; (2) Fluororesin fine particles: for example, polyfluoroethylene resin (such as polytetrafluoroethylene resin), polyvinylfluoride resin, polyvinylidenefluoride resin.

From a review of these prior art disclosures and from a general consideration of other well known prior art teachings, it will be seen that the prior art does not teach a black, chrome-free, multilayer, corrosion protection system designed to meet a minimum of 500 salt spray testing hours to white corrosion, and 1500 salt spray testing hours to red corrosion when tested to ASTM B 117 standards for use on automotive body sheet steel, automotive underbody parts, automotive under-hood parts, and some automotive interior parts specifying a gloss requirement greater than 4. Further, it will be seen that the prior art does not teach a chrome-free, multilayer system comprising a combination of a zinc-iron electroplated substrate, a non-electrolytic phosphate crystal conversion layer using orthophosphoric acid, and a Xylan Teflon/fluorocarbon sealer coating to form a three layer total corrosion protection system.

SUMMARY OF THE INVENTION

It is thus an object of the present invention to provide a black, chrome-free, multilayer, corrosion protection system designed to meet extended corrosion properties. The present invention is a corrosion-resistant finish engineered to meet a minimum of 500 salt spray testing hours to white corrosion, and 1500 salt spray testing hours to red corrosion when tested to ASTM B 117 standards. The present anti-corrosion finish is further designed to comply with the European Union Directive on End of Life Vehicles. The multilayer, anti-corrosion finish or system of the present invention is indeed designed for use on automotive body sheet steel, automotive underbody parts, automotive under-hood parts, and some automotive interior parts specifying a gloss requirement greater than 4. This chrome-free, multilayer system is a combination of a zinc-iron electroplated substrate, a non-electrolytic phosphate crystal conversion layer using orthophosphoric acid, and a Xylan Teflon/fluorocarbon sealer coating to form a three layer total corrosion protection system.

It will thus be seen that the present invention provides a novel multilayer corrosion-resistant finish and method(s) of forming the finish. The multilayer corrosion-resistant finish comprises a combination of (1) a zinc-iron electroplated substrate, (2) a non-electrolytic phosphate crystal conversion layer formed using orthophosphoric acid, and (3) a Xylan Teflon fluorocarbon sealer coating. The noted layers thus form a three layer total corrosion protection system. Through the application of a zinc-iron substrate, the zinc-iron substrate will provide 500–700 hours of salt spray protection by its own design. Due to the iron content, this substrate will act as a conversion source for the attachment, and growth, of phosphate crystals. Notably, this substrate is totally chrome free. The application and growth of phosphate crystals will provide only a minimal amount of salt spray protection. The primary functions of the application and growth of phosphate crystals to the zinc-iron electroplated substrate is to increase the effective surface area thereof and act as an attachment site for a topcoat fluorocarbon sealer. The crystals further provide a heat barrier protection layer. Notably, the process of applying and growing phosphate crystals is also totally chrome free. The application of a fluorocarbon sealant to the phosphate crystal layer is achieved in at least two layers and is heat cured to the phosphate crystals. Again, it is important to note that the fluorocarbon sealant layer is totally chrome-free.

The fluorocarbon sealant layer, in conjunction with the zinc-iron substrate and phosphate crystal conversion layers, creates a salt spray protection layer resulting in a minimum of 500 hours to white corrosion, and a minimum of 1500 hours to red corrosion. The fluorocarbon sealant layer will further provide a coefficient of friction of less than 0.13, or a torque range of 0.11–0.13 to account for the assembly torque requirements in the automotive industry.

Other objects of the present invention, as well as particular features, elements, and advantages thereof, will be elucidated or become apparent from, the following description and the accompanying drawing figures.

BRIEF DESCRIPTION OF THE DRAWINGS

Other features of my invention will become more evident from a consideration of the following brief description of my patent drawings, as follows:

FIG. 1 is a diagrammatic theoretical representation of the reaction mechanisms of zinc phosphate on a zinc-iron galvanic plating layer.

FIG. 2 is a diagrammatic theoretical representation of the reaction mechanisms of zinc phosphate on a zinc-iron galvanic plating layer showing an optional first strike zinc layer.

FIG. 3 is a graph depicting iron (Fe) in deposit vs. zinc (Zn) in bath at various current densities (Pavco's Ziron (Zinc-Iron) plating bath).

FIG. 4 is a graph depicting iron (Fe) in deposit vs. iron (Fe) in bath at various current densities (Pavco's Ziron (Zinc-Iron) plating bath).

FIG. 5 is a graph depicting iron (Fe) in deposit vs. caustic n (Fe) in bath at various current densities (Pavco's Ziron (Zinc-Iron) plating bath).

FIG. 6 is a graph depicting iron (Fe) in deposit vs. temperature at various iron (Fe) levels (Pavco's Ziron (Zinc-Iron) plating bath).

FIG. 7 is a graph depicting iron (Fe) ratio vs. current at various iron (Fe) levels (Pavco's Ziron (Zinc-Iron) plating bath).

FIG. 8 is a graph depicting efficiency vs. current density at various iron (Fe) levels (Pavco's Ziron (Zinc-Iron) plating bath).

FIG. 9(*a*) is a table showing the Hull Cell Scale for Pavco's Diamante Ziron (Zinc-Iron) plating bath.

FIG. 9(*b*) is a reference plate image depicting a "normal" Hull Cell (267 ml) for Pavco's Diamante Ziron (Zinc-Iron) plating bath.

FIG. 10 is a reference plate image depicting the following state: "Low Diamante Ziron Starter" for Pavco's Diamante Ziron (Zinc-Iron) plating bath.

FIG. 11 is a reference plate image depicting the following state: "Metallic Contamination—Add UltraPure" for Pavco's Diamante Ziron (Zinc-Iron) plating bath.

FIG. 12 is a reference plate image depicting the following state: "Organic Contamination or High Particulate Level" for Pavco's Diamante Ziron (Zinc-Iron) plating bath.

FIG. 13 is a reference plate image depicting the following state: "High Brightener Chromium Contamination" for Pavco's Diamante Ziron (Zinc-Iron) plating bath.

DETAILED DESCRIPTION OF THE PREFERRED EMBODIMENT

The preferred embodiment and method of the present invention concerns a novel multi-layer corrosion-resistant finish formed from a novel plating-coating process. The multilayer, corrosion-resistant finish comprises in combination (1) a zinc-iron electroplated substrate, (2) a non-electrolytic phosphate crystal conversion layer formed using orthophosphoric acid, and (3) a Xylan/Teflon fluorocarbon sealer coating. The noted layers thus form a three layer total corrosion protection system. Through the application of a zinc-iron substrate, the zinc-iron substrate will provide 500–700 hours of salt spray protection by its own design. Due to the iron content, this substrate will act as a conversion source for the attachment, and growth, of phosphate crystals. Notably, this substrate is totally chrome-free. The application and growth of phosphate crystals will provide only a minimal amount of salt spray protection. The primary functions of the application and growth of phosphate crystals to the zinc-iron substrate is to increase the effective surface area thereof and act as an attachment site for a topcoat sealer. The crystals further provide a heat barrier protection layer. Notably, the process of applying and growing phosphate crystals is also totally chrome-free. The application of a fluorocarbon sealant coating layer to the phosphate crystal conversion layer is typically achieved with at least two coats and is heat or thermo-cured to the phosphate crystals. Notably, the fluorocarbon sealant coating layer is also totally chrome-free.

The fluorocarbon sealant coating layer, in conjunction with the zinc-iron substrate and phosphate crystal conversion layers, completes a salt spray protection finish resulting in a minimum of 500 hours to white corrosion, and a minimum of 1500 hours to red corrosion. The fluorocarbon sealant coating layer will also provide a coefficient of friction of less than 0.13, or a torque range of 0.11–0.13 to account for the assembly torque requirements in the automotive industry.

The zinc-iron plating substrate is formed utilizing state of the art plating techniques from alkaline solutions. The iron content found therein is preferably in the range of 0.4 to 1.0 percent and will increase corrosion resistance six fold over straight zinc deposits. The deposit provides excellent ductility for the subsequent plating operations as described in more detail hereinafter.

The formation of crystalline phosphate coatings on metal surfaces generally depends on the solubility characteristics of the phosphates of iron and zinc. In general, the primary phosphates of these metals are soluble in water, the secondary phosphates are either unstable or insoluble, and the tertiary phosphates are insoluble. It is the tertiary phosphates that provide the crystal growth and thermal properties of this coating.

Orthophosphoric acid, H3PO4, is a tribasic acid, i.e. it contains three replaceable hydrogen atoms, giving rise to three series of salts. Based on the values of the dissociation constants (K1=0.7101×10−2) at 25° C. the first hydrogen atom is readily disassociated. The mechanism involved in the formation of phosphate coatings is quite complex, but for all processes based on heavy metal phosphate solutions it depends on the following basic equilibrium:

$$\underset{\text{soluble}}{\text{Primary phosphate}} \longleftarrow\ \longrightarrow \underset{\text{insoluble}}{\text{Tertiary phosphate}}$$

This equation is further complicated by involving a metal in the primary solution. The metal will react with the free phosphoric acid present:

$$M+2H_3PO_4 \leftrightarrow M(H_2PO_4)_2+H_2$$

Van Wazer quotes the following equation as being an approximation to the formation of a zinc phosphate coating on an iron surface.

$$Fe + 3Zn(H_2PO_4)_2 + 2H_2O \rightarrow \underset{\text{(coating)}}{Zn_3(PO_4)_2 \cdot 4H_2O} + FeHPO_4 + 3H_3PO_4 + H_2$$

Iron and zinc primary baths will produce macro-crystalline coatings weighing 15–35 g/m2. The iron phosphate baths in particular produce grayish-black to black coatings which are somewhat harder when compared to a corresponding zinc phosphate coating. Phosphating is essentially an electrochemical phenomenon in which dissolution of the metal occurs at the micro-anodes and discharge of hydrogen, followed by hydrolysis and precipitation of insoluble phosphates, takes place at the micro-cathodes. The reader should generally reference FIG. 1 for a diagrammatic representation of the described phenomenon. The basic process involved in the formation of any phosphate coating is the precipitation of a divalent metal (in this case iron Fe), and phosphate ions onto a metal surface. The iron (Fe) disassociates at the cathodic sites and releases two electrons. The reaction of the iron and orthophosphoric acid produces phosphophyllite crystals at the anodic sites of the substrate surface. These crystals precipitate out and are chemically bonded to the surface.

In this design premise, the iron content in the zinc-iron substrate will migrate to the surface and react with the orthophosphoric acid to form phosphophyllite crystals.

Both micro-cathodic and micro-anodic sites will develop and form a metal solution interface for the growth of the zinc-iron-phosphate crystal layer. The crystals precipitate and grow across the surface while being chemically bonded to it. Due the growth of the zinc-iron-phosphate crystals on the zinc-iron substrate this process becomes a "self-limiting process". In other words, the reaction will slowly progress to zero activity as the iron is consumed and crystal growth increases across the surface. The presence of the phosphate crystals contributes a thermal barrier as well.

It is noted that the thermal properties of phosphate coatings are well documented. Pure hopeite ($Zn3(PO4)2\ 4H2O$) loses two molecules of water of crystallization at 70–140° C. (158–284° F.) and a further two molecules at 190–240° C. (374–464° F.). The zinc-iron-phosphate (phosphophyllite) ($Zn2Fe(PO4)2\ 4H2O$) is similar in it loses two molecules of water of crystallization starting at 110° C. (230° F.). The following table shows the "Effect of heating zinc phosphate coatings on steel for 15 minutes.

| Temperature: ° C. | ° F. | Appearance of Coating | Weight Loss (%) |
|---|---|---|---|
| 50 | 122 | Grey | 1.05 |
| 100 | 212 | Grey | 7.90 |
| 150 | 302 | Light grey | 9.90 |
| 200 | 392 | Silver grey, rather dusty | 10.30 |
| 250 | 482 | Silver grey, rather dusty | 10.80 |
| 300 | 572 | Silver grey, rather dusty | 11.30 |
| 350 | 662 | Silver grey, dusty | 12.50 |
| 400 | 752 | Silver grey, dusty | 15.20 |
| 500 | 932 | Brownish, dusty | 16.70 |
| 600 | 1112 | Light Brown (breakdown of coating) | — |

The effect of heating zinc-iron phosphate coatings on steel for 15 minutes should be of equal significance.

With regard to the fluorocarbon topcoat sealer, it is noted that all fluorocarbons have relatively high molecular weight, relatively high melting points, and typically excellent chemical resistance. They have found wide application in chemical and pharmaceutical plants as pipe liners, nozzle liners, gaskets, expansion joints, valve liners, diaphragms for valves and pumps, seals and seal components, and barrier linings for vessels. The Polytetrafluoroethylene (PTFE) sealer/topcoat has a service temperature of 245–260° C. (475–500° F.) and is immune to most corrosive environments. It can also be used at cryogenic temperatures, giving it the widest temperature range of any polymer. It has a very low coefficient of friction and also very good "non-stick" properties. PTFE is a crystalline polymer which does not melt below a temperature of 327° C. (620° F.). The fluorocarbon topcoat will provide 400–450 hours to white corrosion and is black in color. Various notable properties of fluorocarbons include their insolubility in most solvents, they are chemically inert, the have low dielectric loss, they have high dielectric strength, they are uniquely non-adhesive, they comprise low friction properties, relatively constant electrical properties, and high impact strength. The mechanical and electrical properties are constant from 20–250° C., (68–482° F.). In the present invention, a XYLAN product is used as the topcoat sealer. Xylan is an organic coating formulated to give good corrosion resistance with controlled torque-tension characteristics. It contains P.T.F.E. that is perhaps the most hard-wearing and toughest member of the fluorocarbon family, and a resin polymer binder, the function of the latter being to aid adhesion to the substrate and to promote corrosion resistance.

Xylan is available in a number of colors, black and blue being usually supplied. Xylan is usually applied as a double coating onto a phosphate pre-treatment. The standard Xylan used is Xylan 5230, which has a torque-tension relationship, and conforms to Ford specification SZ600A and WZ100, RES 30 FP 105 and BS 7371 Pt. II. (www.ananochrom-group.co.uk/site)

It has also been shown that the improved corrosion resistance from the zinc-iron-phosphate system plus the final topcoat sealer is much greater than the sum of the individual contributions of the phosphate coating and sealer alone.

An example of this statement is the new Ford Specification:

WSS-M21P41-A1

WSS-M21P41-A2

"They consist of a zinc phosphate pretreatment and either an anodic epoxy electrocoat or a cathodic epoxy electrocoat." "For specification A1 the Salt Spray Hours to Ferrous Corrosion (red corrosion) is 120 hrs." "For specification A2 the Salt Spray Hours to Ferrous Corrosion (red corrosion) is 240 hrs."

In this design premise the preferred topcoat sealer used is a Xylan 5230, flourocarbon. Other sealers/sealants can also be applied to the Zinc-Iron-Phosphate substrate, however, including wax and E-coats (Electrophoretically deposited paints). An example of a wax is: PS&T 901 Wax. With regard to E-coats, it is noted that the zinc-iron-phosphate substrate will support an electrical charge and therefore an "Anodic Epoxy Electrocoat" or a "Cathodic Epoxy Electrocoat" will adhere to this substrate. An example of the Cathodic Epoxy Electrocoat is "PPG-III".

These topcoat sealer systems are governed by specifications listed under SAE, ASTM, General Motors, Ford, Daimler-Chrysler, and Delphi Automotive. The total salt spray protection of these types of sealers on the Zinc-Iron-Phosphate system has not been determined as of this writing.

The primary benefit and/or application of the disclosed plating-coating system is that in combination these three layers will provide a total corrosion resistance of minimum 1500 hrs to red corrosion. The plating combination will be black, totally chrome-free, and will resist plastic injection molding temperatures. The topcoat sealer in this corrosion finish will provide coefficient of friction properties between 0.15–0.16, based on research at Whitford Plastics Ltd. For the process of injection molding, the over-molding temperatures will be 190° F. prior to injection and as high as 560–570° F. (melting temperature of nylon 66) during processing. Cycle times are in the range of 30–40 seconds (note: high cycle times).

It should be noted that the adherence of electrodeposited zinc, or zinc-alloys depends on the metal-to-metal bond between the plated coating and the underlying steel surface. Therefore, particular attention must be given to the preparation of the metal substrate or surface before plating to obtain a coating in true physical contact with the entire steel surface. The usual method of removing all rust, scale, and grease from the steel surface involves cleaning the surface thoroughly in a hot alkaline bath by soaking the parts for a short period of time. This is often followed by use of an electrolytic alkaline cleaner and a spray alkaline cleaner. An acid dip is then carried out to remove oxides and scale. There must be adequate rinsing between the alkaline/acid baths and the acid/plating baths to avoid contamination of the plating bath by carryover from the cleaning baths.

Thus, the cleaning process may be summarized with the following five (5) steps: (1) Soak Cleaner; (2) Electro Clean; (3) First Rinse Stage; (4) Acid Clean; and (5) Final or Second Rinse Stage. The Soak Cleaner step involves soaking the metal substrate in a soak chemical and is designed for the removal of grease, oil, soil, and some metallic debris. Examples of soak chemicals are: American Chemco Soak # 912 or PAVCO Clean-R 120 GR. Typically the soak chemicals are functional operating at 8 to 12% by volume, a bath temperature of 140 to 160° F., and an immersion time of about 8 to 20 minutes. The Electro-Clean step comprises bathing the metal substrate in an electro-clean chemical. Examples of electro-clean chemicals are Deveco 242 or 10 to 16 oz/gal American Chemco ElectroClean 220. Six to twelve volts reverse current is then applied to the electro-clean chemical to a maximum 100 amps per barrel (bath temperature ranging from 140–160° F. and an immersion time of 6 to 15 minutes). Thus, the metal substrate is electro-cleaned. The first or initial rinse stage is accomplished via a rinse compound (preferably tap water at ambient temperature (3 gallons per minute double station counterflow)). The acid clean step is preferably achieved with 5 to 50% by volume Hydrochloric Acid with 0.5% Ambienol C Inhibitor (ambient temperature with an immersion time of 6 to 15 minutes). Thus, the metal substrate is acid-cleaned. The second or final rinse stage is accomplished via the rinse compound (tap water at ambient temperature (3 gallons per minute double station counterflow)).

In order to provide a stronger bond to the metal surface for the zinc-iron plating it is often (optionally) necessary to apply a first strike zinc layer to the metal. The reader should reference FIG. 2, which figure generally illustrates the first strike zinc layer. This layer is usually of minimal thickness ranging from 0.00005 inches-0.0001 inches. The zinc plating is done in an acid (hydrochloric) bath. Various brightening agents may be added to the baths to produce a deposit that is more lustrous than that obtained from normal zinc plating baths. The amount of brightening agent requires very careful control, and the bath and the zinc anode must both be kept particularly pure when brighteners are used. The normal electroplated zinc coating is dull gray with a matte finish. Notably, a so-called test coupon must be added to the bath to determine total weight of zinc+zinc-iron substrate, and to calculate the coating weight of phosphate. The standard that governs the "test coupon" process is: ASTM Standard B 767 (Standard Guide for Determining Mass Per Unit Area of Electrodeposited and Related Coatings by Gravimetric and Other Chemical Analysis Procedures). Other Standards include MIL C-16232. Due to the electrical nature of this type plating process all Plated Parts shall be tested and evaluated in accordance with SAE/USCAR-1. This standard outlines the conditions that enhance the risk of hydrogen embrittlement of steel and define the relief procedures required to minimize the risk of hydrogen embrittlement. It is intended to control the process.

The zinc plating bath, barrel process, is setup as follows: 2 to 6 ounces per gallon Zinc Metal; 16 to 22 ounces per gallon Ammonium Chloride; 3 to 5% by volume King Supply Wetter or equivalent; 0.5% ChemTech 3800 Brightener or equivalent. The pH of the bath is maintained from 5.2 to 6.8 using Hydrochloric Acid. One to two pints of Hydrogen Peroxide are added to the bath, with filtering, to remove iron. The bath temperature is preferably held within the range of 70 to 110° F. (Note: if the bath temperature exceeds 110° F. a high temperature wetter must be used.) The immersion time is 30 to 90 minutes or until correct thickness is reached. The current density is 15 to 25 amps/sq.ft. Voltage is not to exceed 10 volts DC. Finally, a rinse step comprises 3 gallons per minute single station tap water rinse (ambient temperature).

Preferred Zinc-Iron Plating Process

In this design premise, the Pavco's Ziron system for depositing a Zinc-Iron layer to the metal substrate will be used. This process is a non-cyanide, alkaline zinc-iron alloy plating system. The Pavco's Ziron Zinc-Iron plating bath, barrel process, is setup with the following specifications:

Zinc Metal: 1.0–3.0 oz/gal (7.5–22.5 gms/L). Optimum: 1.8 oz/gal (13.5 gms/L).

Reference FIG. 3 (Fe in Deposit vs. Zn in Bath @ Various Current Densities).

Iron Metal: 30 to 120 ppm (Optimum: 50 ppm)

Reference FIG. 4 (Fe in Deposit vs. Fe in Bath @ Various Current Densities)

Sodium Hydroxide: 14.0 to 22.0 oz/gal (105–165 gms/L)

Optimum: 18.0 oz/gal (135 gms/L) (Sodium Hydroxide (Caustic Soda) should be mercury cell or rayon grade, free of lead.).

Reference FIG. 5 (Fe in Deposit vs. Caustic in Bath (Various Fe Levels)

Bath Temperature: to be held within the range of 75 to 95° F. (24 to 35° C.)

Optimum: 85° F. (29° C.). Reference FIG. 6 (Fe in Deposit vs. Temperature @ Various Fe Levels).

Average Current Density:

Barrel: 1–20 ASF (0.1–2.2 A/dm$^2$) Optimum: 5–10 ASF (0.5–1.1 A/dm$^2$)

Rack: 3–120 ASF (0.3–13.0 A/dm$^2$) Optimum: 10–25 ASF (1.1–2.7 A/dm$^2$)

The reader should reference FIGS. 7 and 8 (Fe Ratio vs. Current @ Various Fe Levels) and (Efficiency vs. Current Density @ Various Fe Levels), respectively.

Addition Agents

Ziron Brightener 0.05–0.20%/volume (Optimum: 0.05%/volume)

Ziron Brightener is an amber liquid with an SpG of 1.001–1.024 and a pH of 2.5–9.0

Ziron Starter 1.0–3.0%/volume (Optimum: 1.5%/volume)

Ziron Starter is a pale amber liquid with an SpG of 1.001–1.054 and a pH of 8.5–9.5

Alkaline Wetter 0.005–0.015%/volume (Optimum: 0.01%/volume)

(Alkaline Wetter is used to suppress caustic fumes and is usually needed only at start-up.

Alkaline Wetter is a clear liquid with an SpG of 1.000–1.007 and a pH of 11.0–11.9

UltraPure 0.25–0.75%/volume (Note: UltraPure acts as a purifier and the amount needed depends on the level of impurities. It is recommended that the user start at 0.25% and increase as necessary. UltraPure is a clear liquid with an Specific Gravity of 1.027–1.051 and a pH of 11.3–13.3

Ziron Additive Fe 0.3–1.5% volume (Optimum: 0.5% volume)

(1% addition of Ziron Additive Fe=~100 ppm iron in the plating bath)

Ziron Additive Fe is a clear bright yellow-green liquid with an SpG of 1.038±0.004 & a pH of 0.8–1.2.

Complexor A 1.0 to 4.0 oz/gal (7.5–30.0 gms/L) Optimum: 2.0 oz/gal (15 gms/L)

Complexor A is a white-yellow granular powder.

Maintenance Schedule

Ziron Brightener: 1 gal/20,000–30,000 amp. hrs. (1 L/5, 000–8,000 amp hrs.).

Ziron Starter: Per drag-out (can be proportioned to Sodium Hydroxide additions)

Sodium Hydroxide: By analysis

Zinc Metal: Controlled by Generator Tank

Iron Metal: By Atomic Absorption or Spectrophotometric analysis

Complexor A: By Spectrophotometric analysis and drag-out

Bath Makeup

Before making up the bath, clean and leach out the tank properly, making sure bus bars and anodes are also cleaned. Pavco recommends using Zincate solution which contains the necessary zinc and caustic. Deionized water is preferred for make up. After the bath is made up, electrolysis will be beneficial.

Procedure (Zincate Concentrate)

(Use Constant Agitation with each Step).

1. Add water to the cleaned tank up to ~25% of the final volume.
2. Add the recommended level of Zincate concentrate.
3. Add water to 90% of the final volume.
4. Add the recommended amount of UltraPure.
5. Add the recommended amount of Ziron Starter, Ziron Brightener.
6. Add the recommended amount of Complexor A.
7. Add the recommended amount of Ziron Additive Fe.
8. Analyze caustic level and adjust if needed.
9. Fill the cleaned steel baskets in the Generator Tank with Special High Grade (SHG 99.99% pure) zinc.
10. Add water to the final volume.

Analytical Procedures: Zinc Analysis

It should be noted that fumes are poisonous if using this method of zinc determination with a bath containing cyanide.

Reagents

1. Acetate Buffer
   To make up, dissolve:
   a) 180 grams of anhydrous Sodium Acetate
   b) 30 ml of Acetic Acid
   c) Add D.I. or Distilled Water to make one liter
2. Xylenol Orange Indicator
   To make this indicator, dissolve 1 gram of Xylenol Orange in 1 liter of D.I. or Distilled Water
3. 0.1M Disodium EDTA Solution
4. 30% Hydrochloric Acid (HCl)

Procedure

1. Into a 400 ml beaker, pipette a 5 ml bath sample.
2. Add 5 ml of 30% HCl.
3. Add -150 ml Distilled or D.I. water.
4. Add 50 ml Acetate Buffer
5. Add sufficient Xylenol Orange Indicator (~0.5 ml) to give a fuchsia color (bright reddish pink)
6. Titrate with 0.1M Disodium EDTA solution until the color changes to yellow.

This changes very rapidly; proceed very slowly. In some baths an orange color will occur seconds before the yellow.

7. Calculation:

ml of titration×0.176=zinc in oz/gal ml of titration×1.32=zinc in gm/L (Caustic) Sodium Hydroxide Analysis Reagents 1. Indigo Carmine Indicator (½% in water) (should be refrigerated to extend its shelf life)
2. 0.95N Standard Sulfuric Acid Procedure 1. Pipette a 5 ml sample into a 400 ml beaker.
2. Add 10 mls of D.I. water
3. Add 2–6 drops of Indigo Carmine Indicator
4. Titrate with 0.95N Std. Sulfuric Acid until color changes:
   Yellow→Blue
5. Calculation:

ml of 95N Std. Sulfuric Acid titration+oz/gal zinc metal=caustic in oz/gal

Analysis for Iron in the Ziron Plating Bath Solution:

Reagent 1. 20% Sulfuric Acid

Use laboratory grade Sulfuric Acid. Use only Deionized or Distilled Water to dilute the acid Note: (Always add acid to the water).

Procedure

1. Pipette 5 ml of the plating bath solution into a clean 50 ml glass or plastic beaker (Use clean plastic or glass containers free from contamination).
2. Pipette 15 ml of 20% Sulfuric Acid (by volume) into the plating bath solution beaker. Mix by stirring or agitation.
3. Check iron on Atomic Absorption unit per procedure as provided by your A. A. supplier.
4. Calculation:

Iron ppm×4=Iron ppm in the bath

Recommended Iron range: 40–120 ppm

Analysis for Complexor A

Reagents

1. Sodium Hydroxide Solution
2. Copper Sulfate Solution

Equipment

Spectrophotometer: Spectronic 601 or Hach DR-3

Procedure

1. Pipette a 5 ml sample of the plating bath into a 100 ml volumetric flask.
2. Add 50 mls of D.I. water.
3. Add 20 mls of 100 g/l Sodium Hydroxide solution.
4. Mix.
5. Pipette 5 mls of 100 g/l Copper Sulfate solution.
6. Bring the flask up to volume with D.I. Water.
7. Mix the solution thoroughly and allow to settle for 15 minutes.
8. Filter the clear solution from the Volumetric Flask through 541 filter paper.
9. Rinse the sample cuvette 2–3 times with filtered solution.

10. Set the spectrophotometer for transmittance and set the wavelength at 610 nm.

11. Re-zero with a Deionized Water blank.

12. Place the sample cuvette with filtered solution into the spectrophotometer.

13. Read the transmittance of the sample.

14. Compare the reading to a predetermined standard curve.

NOTE: If the concentration of Complexor A is more than 2 oz./gal. in the plating bath, dilute the solution (after step 8) by 50% with D.I. Water and multiply the result by 2.

The user should take special precautions to avoid contact with skin, eyes or clothing. Further, the user should wash contaminated clothing before reuse. Still further, it is recommended that the user not reuse containers for any purpose.

Analysis for Iron in the Zinc-Iron Deposit

Reagent 1. 50% Hydrochloric Acid (Reagent Grade only)

Procedure

1. Weigh a copper Hull Cell panel before plating.

Make sure it is clean and free from water breaks. Use an analytical balance.

a=weight of the Hull Cell panel in grams before plating

2. Weigh the copper Hull Cell panel after plating.

b=weight of the Hull Cell panel in grams after plating

3. Calculation:

$b-a$=grams net zinc-iron deposit ($c$)

$c\times1,000$=mg. net zinc-iron deposit ($d$)

4. Measure into a volumetric flask 100 ml. of 50% Hydrochloric Acid. Pour the Hydrochloric Acid into a plastic container.

5. Strip the Hull Cell panel completely using the Hydrochloric Acid (prepared in step 4).

6. Check the iron on an Atomic Absorption unit (AA) (e) per procedure as provided by your A. A. supplier.

e=ppm iron

7. Calculation:

$e\div10$=mg. iron in the deposit ($f$)

$(f\div d)\times100$=% iron in the alloy deposit

% Iron deposit in the alloy should range from 0.3–1.2%

Notably, a so-called "test coupon" must be added to the bath to determine total weight of the zinc-iron substrate, and to calculate the coating weight of phosphate. The standard that governs the "test coupon" process is: ASTM Standard B 767 (Standard Guide for Determining Mass Per Unit Area of Electrodeposited and Related Coatings by Gravimetric and Other Chemical Analysis Procedures). Other standards include MIL C-16232. Further, the adhesion of the Zinc-Iron layer to the metal substrate is governed by the ASTM Standard B571. Due to the electrical nature of this type plating process all plated parts shall be tested and evaluated in accordance with SAE/USCAR-1.

The Pavco Ziron zinc-iron plating process as heretofore shall hereinafter be referred to as the "first" non-cyanide, alkaline zinc-iron alloy plating method. Thus, any reference to the first non-cyanide, alkaline zinc-iron alloy plating method should be considered defined by the foregoing descriptions. Notably, critical to the Pavco Ziron zinc-iron plating process is the use of sodium hydroxide.

Zinc-Iron Plating Process Alternative No. 1

A sound alternative to the Pavco Ziron zinc-iron plating process as hereinabove described is Pavco's Diamante Ziron alkaline plating process. This process is also a non-cyanide, alkaline zinc-iron alloy plating system, which process may be essentially distinguished from the Pavco Ziron zinc-iron plating process in that the Pavco Diamante Ziron zinc-iron plating process makes use of potassium hydroxide instead of sodium hydroxide. The Pavco's Diamante Ziron zinc-iron plating process is suitable for either rack or barrel operations. The process is setup as follows:

Zinc Metal: 0.8–1.8 oz/gal (6.0–13.5 gms/L) (Optimum: 1.2 oz/gal (9.0 gms/L))

Iron: 30 to 120 ppm (Optimum: 75 ppm)

Potassium Hydroxide: 14.0 to 25.0 oz/gal (105–187 gms/L) Optimum: 20.0 oz/gal (150 gms/L) (Potassium Hydroxide (Caustic Potash) should be mercury cell or rayon grade, free of lead.)

Bath Temperature: to be held within the range of 75 to 95° F. (24 to 35° C.).

Optimum: 85° F. (29° C.)

Average Current Density

Barrel 1–20 ASF (0.1–2.2 A/dm$^2$) Optimum: 5–10 ASF (0.5–1.1 A/dm$^2$)

Rack 3–120 ASF (0.3–13.0 A/dm$^2$) Optimum: 10–25 ASF (1.1–2.7 A/dm$^2$).

The reader is directed to FIG. 12 (Organic Contamination or High Particulate Level).

For purposes of comparison, the reader is directed to FIG. 9(*a*) (Hull Cell Scale) and FIG. 9(*b*) HULL CELL TEST-267 ml Hull Cell Reference Plate: "Normal".

Addition Agents

Diamante Ziron Brightener: 0.1–0.3%/volume (Optimum: 0.2%/volume)

Diamante Ziron Brightener is an amber liquid with an SpG of 1.001–1.024 and a pH of 2.5–9.0

Diamante Ziron Starter: 1.0–4.0%/volume (Optimum: 3.0%/volume)

Ziron Starter is a pale amber liquid with an SpG of 1.001–1.054 and a pH of 8.5–9.5.

The reader should reference FIG. 10 (Low Diamante Ziron Starter).

Alkaline Zinc Wetter 0.005–0.015%/volume (Optimum: 0.01%/volume)

(Alkaline Zinc Wetter is used to suppress caustic fumes and is usually needed only at start-up.) Alkaline Zinc Wetter is a clear liquid with a SpG of 1.000–1.007 and a pH of 11.0–11.9.

UltraPure: 0.25–1.5%/volume (Optimum: 0.75%/volume)

UltraPure acts as a purifier and a low current density brightener. (Again, the amount needed depends on the level of impurities. It is recommended that the user start at 0.25% and increase as necessary.) UltraPure is a clear liquid with a Specific Gravity of 1.027–1.051 and a pH of 11.3–13.3. The reader should reference FIG. 11 (Metallic Contamination—Add UltraPure).

Diamante Ziron Additive Fe 0.25–1.0% volume (Optimum: 0.75% volume)

(1% addition of Ziron Additive Fe=~100 ppm of Iron in the plating bath)

Diamante Ziron Additive Fe is a clear bright yellow-green liquid with a SpG of 1.038±0.004 & a pH of 0.8–1.2.

Complexor A 1.0 to 4.0 oz/gal (7.5–30.0 gms/L) (Optimum: 2.0 oz/gal (15 gms/L))

Complexor A is a white-yellow granular powder.

Maintenance Schedule:

Diamante Ziron Brightener: 1 gal/20,000–30,000 amp. hrs. (1L/5,000–8,000 amp hrs.).

The reader is directed to FIG. 13 (High Brightener Chromium Contamination).

Diamante Ziron Starter: Per drag-out (can be proportioned to Potassium Hydroxide additions)

Potassium Hydroxide: Per Drag out and by analysis.

Zinc Metal: Controlled by Generator Tank

Iron Metal: By Atomic Absorption analysis

Complexor A: By Spectrophotometric analysis and drag-out

Bath Makeup

Before making up the bath, clean and leach out the tank properly, making sure bus bars and anodes are also cleaned. Pavco recommends using Diamante Zincate solution containing the necessary zinc and caustic. Deionized water is preferred for make up. After the bath is made up, electrolysis will be beneficial.

Procedure (Zincate Concentrate) (Use Constant Agitation with each Step).

1. Add water to the cleaned tank up to ~70% of the final volume.
2. Add the recommended level of Diamante Zincate concentrate.
3. Add water to ~90% of the final volume.
4. Add the recommended amount of UltraPure.
5. Add the recommended amount of Diamante Ziron Starter, Diamante Ziron Brightener.
6. Add the recommended amount of Complexor A.
7. Add the recommended amount of Ziron Additive Fe.
8. Analyze caustic potash level and adjust if needed.
9. Fill the cleaned steel baskets in the Generator Tank with Special High Grade (SHG 99.99% pure) zinc.
10. Add water to the final volume.

Analytical Procedures:

Zinc Analysis

NOTE: Fumes are poisonous if using this method of zinc determination with a bath containing cyanide.

Reagents

1. Acetate Buffer

To make up, dissolve:

a) 180 grams of anhydrous Sodium Acetate b) 30 ml of Acetic Acid c) Add D.I. or Distilled Water to make one liter 2. Xylenol Orange Indicator To make this indicator, dissolve 1 gram of Xylenol Orange in 1 liter of D.I. or Distilled Water 3. 0.1M Disodium EDTA Solution 4. 30% Hydrochloric Acid (HCl)

Procedure

1. Into a 400 ml beaker, pipette a 5 ml bath sample.
2. Add 5 ml of 30% HCl.
3. Add ~150 ml Distilled or D.I. water.
4. Add 50 ml Acetate Buffer
5. Add sufficient Xylenol Orange Indicator (~0.5 ml) to give a fuchsia color (bright reddish pink)
6. Titrate with 0.1M Disodium EDTA solution until the color changes to yellow.

This changes very rapidly; proceed very slowly. In some baths an orange color will occur seconds before the yellow.

7. Calculation:

ml of titration×0.176=zinc in oz/gal ml of titration×1.32=zinc in gm/L (Caustic) Potassium Hydroxide Analysis Reagents 1. Indigo Carmine Indicator (should be refrigerated to extend its shelf life)
2. 0.95N Standard Sulfuric Acid Procedure 1. Pipette a 5 ml sample into a 125 ml Erlenmeyer Flask.
2. Add 10 mls of D.I. water
3. Add 2–6 drops of Indigo Carmine Indicator
4. Titrate with 0.95N Std. Sulfuric Acid until the color changes: Yellow→Blue
5. Calculation: (ml of 95N Std. Sulfuric Acid titration+oz/gal zinc metal)×1.4=KOH in oz/gal Analysis for Iron in the Diamante Ziron Plating Bath Solution:

Reagent 1. 20% Sulfuric Acid

Use laboratory grade Sulfuric Acid. Use only Deionized or Distilled Water to dilute the acid Note: (Always add acid to the water).

Procedure

1. Pipette 5 ml of the plating bath solution into a clean 50 ml glass or plastic beaker (Use clean plastic or glass containers free from contamination).
2. Pipette 15 ml of 20% Sulfuric Acid (by volume) into the plating bath solution beaker. Mix by stirring or agitation.
3. Check iron on Atomic Absorption unit per procedure as provided by your A. A. supplier.
4. Calculation:

Iron ppm×4=Iron ppm in the bath

Recommended Iron range: 40–120 ppm

Analysis for Complexor A

Reagents

1. Sodium Hydroxide Solution, 100 g/l
2. Copper Sulfate Solution, 100 g/l

Equipment

Spectrophotometer: Spectronic 601 or Hach DR-3

Procedure

1. Pipette a 5 ml sample of the plating bath into a 100 ml volumetric flask.
2. Add 50 mls of D.I. water.
3. Add 10 mls of 100 g/l Sodium Hydroxide solution.
4. Mix solution.
5. Pipette 5 mls of 100 g/l Copper Sulfate solution.
6. Bring the flask up to volume with D.I. Water.
7. Mix the solution thoroughly and allow to settle for 15 minutes.
8. Filter the clear solution from the Volumetric Flask through 541 filter paper.
9. Rinse the sample cuvette 2–3 times with filtered solution.
10. Set the spectrophotometer for transmittance and set the wavelength at 610 mn.

11. Re-zero with a Deionized Water blank.

12. Place the sample cuvette with filtered solution into the spectrophotometer.

13. Read the transmittance of the sample.

14. Compare the reading to a predetermined standard curve.

NOTE: If the concentration of Complexor A is more than 2 oz./gal. in the plating bath, dilute the solution by 50% with D.I. Water and multiply the result by 2.

Special Precaution: Avoid contact with skin, eyes or clothing. Wash contaminated clothing before reuse. Do not reuse containers for any purpose.

Analysis for Iron in the Zinc-Iron Deposit

Reagent 1. 50% Hydrochloric Acid (Reagent Grade only)

Procedure

1. Weigh a copper Hull Cell panel before plating.

Make sure it is clean and free from water breaks. Use an analytical balance.

a=weight of the Hull Cell panel in grams before plating

2. Weigh the copper Hull Cell panel after plating.

b=weight of the Hull Cell panel in grams after plating

3. Calculation:

$b-a$=grams net zinc-iron deposit ($c$)

$c\times1{,}000$=mg. net zinc-iron deposit ($d$)

4. Measure into a volumetric flask 100 ml. of 50% Hydrochloric Acid. Pour the Hydrochloric Acid into a plastic container.

5. Strip the Hull Cell panel completely using the Hydrochloric Acid (prepared in step 4).

6. Check the iron on an Atomic Absorption unit (AA) (e) per procedure as provided by the A. A. supplier.

e=ppm iron

7. Calculation:

$e\div10$=mg. iron in the deposit ($f$)

$(f\div d)\times100$=% iron in the alloy deposit

% Iron deposit in the alloy should range from 0.3–1.2%

The reader should note that the Pavco Diamante Ziron zinc-iron plating process as heretofore described or specified shall hereinafter be referred to as the "second" non-cyanide, alkaline zinc-iron alloy plating method. Thus, any reference to the second non-cyanide, alkaline zinc-iron alloy plating method should be considered defined by the foregoing descriptions. As earlier specified, this process is also a non-cyanide, alkaline-based zinc-iron alloy plating system, which process may be essentially distinguished from the Pavco Ziron zinc-iron plating process in that the Pavco Diamante Ziron zinc-iron plating process makes use of potassium hydroxide instead of sodium hydroxide.

Zinc-Iron Plating Process Alternative No. 2

As a second zinc-iron plating alternative, the Atotech Reflectalloy ZFA alkaline Zinc-Iron Plating Process may be used. This process uses a concentrated liquid brightener system to produce uniform, brilliant zinc-iron deposits. The process combines excellent throwing and covering power and can be used in both barrel and rack applications. The low bath chemistry offers an excellent efficiency and plate distribution.

The Atotech Reflectalloy ZFA alkaline zinc-iron plating process as hereinafter described/specified shall hereinafter be referred to as the "third" non-cyanide, alkaline zinc-iron alloy plating method. Thus, any reference to the third non-cyanide, alkaline zinc-iron alloy plating method should be considered defined by the hereafter found descriptions. Notably, the Pavco Ziron zinc-iron plating process and the Atotech Reflectalloy ZFA alkaline zinc-iron plating process both make use of sodium hydroxide. The primary effective difference between the Pavco Ziron zinc-iron plating process and the Atotech Reflectalloy ZFA alkaline zinc-iron plating process is that the latter makes use of different stabilizers than the former. The reader will thus note the difference as the following descriptions are considered. The Atotech Reflectalloy ZFA Zinc-Iron plating process is setup as follows:

Zinc Metal: 0.8–1.3 oz/gal (6.0–10.0 gms/L). Optimum: 1.0 oz/gal (7.5 gms/L).

Iron Metal: 70 to 90 ppm (70–90 mg/l). Optimum: 80 ppm.

Sodium Hydroxide: 10.0 to 16.0 oz/gal (75–120 gms/L). Optimum: 12.0 oz/gal (90 gms /L).

Bath Temperature: to be held within the range of 75 to 85° F. (20 to 29° C.). Optimum: 80° F. (26.6° C.)

Cathode Current Density

Barrel 2–10 ASF (0.2–1.0 A/dm$^2$)

Rack 10–30 ASF (1.0–3.0 A/dm$^2$)

Addition Agents

ZFA-70 Brightener: 2.0–3.0%/volume (20–30 ml/l). Optimum: 3.0%/volume (30 ml/l). Start at 1.0% by vol. (10 ml/l) and bring up to 3.0% by vol. (30 ml/l).

ZFA-71 Booster: 0.05–0.2%/volume (0.5–2.0 ml/l)

Optimum: 0.015%/volume (30 ml/l).

Required Materials

| | 100 Gallons | 100 Liters |
|---|---|---|
| ECOLOZINC ZINC SOL AZ - | 10 gallons | 10 liters |
| Sodium Hydroxide: | | |
| Solid - | 51 lbs | 6.1 kg |
| or | | |
| 50% Liquid - | 102 lbs | 12.2 kg |
| ZFA-70 Brightener - | 1.5 gallons | 1.5 liters |
| ZFA-71 Booster - | 0.15 gallons | 0.15 liters |
| ZFA-72 Maintenance - | 0.6 gallons | 0.6 liters |
| ZFA-73 Stabilizer - | 0.3 gallons | 0.3 liters |
| ZFA-74 Carrier - | 1.5 gallons | 1.5 liters |

Solution Operation

Temperature: Operating temperatures above 80° F. (27° C.) can cause an increase in iron concentrations in the deposit, dull low current densities, and resulting chromating problems. Temperatures below 70° F. (20° C.) can cause a decrease in iron composition, especially in low current density areas, resulting in poor corrosion protection.

Maintenance Additions:

Operation of the REFLECTALLOY ZFA Process will require additions of zinc metal, sodium hydroxide, iron metal, ZFA-70 Brightener, ZFA-71 Booster, ZFA-73 Stabilizer, and ZFA-72 Maintenance. It is important to remember that small, frequent additions of any component are preferable to occasional large additions.

Zinc Metal

The zinc level in the plating bath is best kept constant between 0.8–1.3 oz/gal (6–10 g/l). Zinc levels below this range will result in low bath efficiency. Therefore, the zinc concentration should be analyzed regularly and adjusted, when necessary. In order to prevent roughness, steel anodes are used rather than zinc anodes. The zinc metal content is maintained using a separate off-line zinc generator tank. For more information on this unit, a technical bulletin, "Requirements for a Zinc Generator Tank", is available from Atotech.

Sodium Hydroxide

Sodium hydroxide ensures the necessary conductivity of the plating bath and also acts to complex zinc metal. If the sodium hydroxide level is too low, the plating rate and current carrying ability are reduced. The level of sodium hydroxide should be analyzed regularly to maintain the concentration within the range of 13–16 oz/gal (75–120 g/l). Sodium hydroxide is normally maintained by additions from the zinc generator although, at times, it may be necessary to add 50% sodium hydroxide solution to the plating bath itself based on analyses.

Iron Metal

The composition of the electrodeposit will depend upon the iron level within the plating bath. Iron concentrations should be kept within the range of 0.01–0.02 oz/gal (0.075–0.15 g/l). Iron levels below this range will give deposits with low iron and result in relatively poor corrosion protection and poor growth of the phosphate crystals. Iron levels above this range will give deposits that may tend to blister. The effects on the phosphate crystal growth and color will need to be determined. Iron metal is replenished by additions of ZFA-72 Maintenance (note that the steel anodes do not supply iron metal to the bath). ZFA-72 Maintenance contains 2.7 oz/gal (20 g/l) of iron metal. Therefore, for every hundred gallons of plating bath, 1 pint of ZFA-72 Maintenance will raise the iron concentration by approximately 0.0034 oz/gal. (For every hundred liters of bath, 125 ml of ZFA-72 Maintenance will raise the iron concentration by 0.025 g/l). The depletion of iron will vary greatly with operating conditions (drag-out, drag-in, etc.) so the bath should be analyzed routinely to follow the iron concentration. If the iron concentration is too high due to incorrect additions or improper rinsing, air agitation may be utilized to oxidize the iron and reduce the amount in solution.

ZFA-73 Stabilizer

ZFA-73 Stabilizer is the complexing agent that controls the amount of iron deposited. High levels of ZFA-73 Stabilizer will result in low iron in the deposit with the subsequent loss of corrosion protection. Low levels of ZFA-73 Stabilizer can lead to increased pitting and iron insolubility. ZFA-73 Stabilizer should be added whenever ZFA-72 Maintenance is added in the ratio of 1 part ZFA-73 Stabilizer to 1.7 parts ZFA-72 Maintenance.

Organic Additives

The organic additives, ZFA-70 Brightener and ZFA-71 Booster, are maintained based on ampere-hours. The following approximate rates apply:

ZFA-70 Brightener—10,000–12,000 amp-hrs/gallon (2640–3170 amp-hrs/liter).

ZFA-71 Booster—18,000–20,000 amp-hrs/gallon (4760–5285 amp-hrs/liter).

Rack plating will normally consume less brightener than barrel plating, due to the difference in drag out between the two. These additives should be added using a dosage pump or, if added manually, added hourly in small amounts.

Pretreatment

Since the REFLECTALLOY ZFA Process is an alkaline non-cyanide system, it does not have the built-in cleaning ability of cyanide baths. Therefore, good control and maintenance of the cleaners and acid pickle and thorough rinsing are necessary and required for satisfactory quality. Typical soak and electrocleaners used in alkaline non-cyanide zinc plating can be used. Consult your local Atotech representative for recommendations. Rinses must be alkaline prior to entering the REFLECTALLO ZFA bath. Acidic (low pH) rinses will bring soluble iron into the bath causing the level to rise and result in dark low current density areas.

Pre-Dip Treatment

The use of a pre-dip made up with 0.8–1.0 oz/gal (6.0–7.5 g/l) of sodium hydroxide is recommended. This solution removes any acid film and prevents flash rusting of the substrate. Parts should not be rinsed between the pre-dip and the plating tank.

Solution Impurities

Copper is the most common type of impurity found in the alkaline zinc-iron system. Copper contamination will cause adhesion problems. If contamination occurs, copper can be removed by low current density dummy plating. The effect can also be minimized by adding small amounts of ZFA-75 Purifier. This should only be required in extreme cases of contamination. Chrome contamination can result from the proximity of chromating tanks. Poor medium current density brightness and poor adhesion are possible indications of chrome contamination. Addition of ZFA-75 Purifier or a zinc dust treatment should alleviate the problem. Contaminated acid pickles are a common source of plating problems, especially if these pickles are used to strip parts. They can then build up in chrome, nickel, and iron and these impurities can cause adhesion problems of subsequent deposits or lead to contamination of the plating bath itself. It is recommended that the pickle tank not be used for stripping parts and that the pickle be dumped and re-made at frequent intervals. If low current density areas are dull, quite often this is the result of metallic impurities. In these cases, an addition of ECOLOZINC PURIFIER A can overcome the problem. Additions should be made in 0.1% by vol. increments to a Hull Cell to determine the proper amount needed. If a white haze appears over most of the deposit, an addition of ECOLOZINC CONDITIONER SS may be required to remove impurities.

Determination of Zinc Metal

1. Pipette exactly 3 ml of plating solution into a 250 ml Erlenmeyer flask and dilute with about 100 ml of deionized water.

2. Add 6M Hydrochloric Acid dropwise while stirring until turbidity is obtained. Add 1 or 2 drops in excess.

3. Add 5 ml of a 10% by volume aqueous solution of Triethanolamine. Dilute with 10 ml of Ammonium Hydroxide-Chloride Buffer solution and mix well.

4. Add 0.2–0.3 grams of Eriochrome Black T indicator and immediately titrate with Standard 0.0575 M EDTA until the color changes from red to blue.

5. Calculate the Zinc metal concentration:

Zinc (oz/gal)=ml of 0.0575 M EDTA required×0.167

Zinc (g/l)=ml of 0.0575 M EDTA required×1.253

Determination of Iron

Numerous methods exist to determine iron in aqueous solutions. Any valid method in which zinc does not interfere (such as atomic absorption) may be used in place of the following colorimetric method.

1. Pipette exactly 5 ml of plating bath into a 100 ml volumetric flask and dilute with 50 ml of deionized water.

2. Add 15 ml of 6M Hydrochloric Acid solution, 5 ml of 10% Ammonium Persulfate solution, and mix well.

3. Add 10 ml of 3M Ammonium Thiocyanate solution and bring to volume using deionized water. Mix well.

4. Prepare a blank by following steps 1–3 except that no bath sample is added.

5. Determine the absorbance of this solution at 480 nm using a Colorimeter or UV-Vis Spectrophotometer and using the blank sample from step 4 as a reference. Determine the iron concentration by comparison to a previously determined calibration curve (see CALIBRATION CURVE section). Absorbance should be determined within 30 minutes of sample preparation.

Preparation of the Calibration Curve

1. Pipette and transfer a 5 ml sample of ZFA-72 Maintenance to a 1000 ml volumetric flask. Add 25 ml of 6M Hydrochloric Acid solution and dilute with deionized water to the calibration mark, stopper, and shake well.

2. Pipette 0, 1, 5, and 10 ml samples of the above solution to respective 100 ml volumetric flasks.

3. Follow steps 1–5 from the above procedure for each flask in step 2 to get an absorbance for each flask.

4. Plot absorbance vs. 0.0, 0.02, 0.10 and 0.20 g/l for the respective 0, 0.4, 0.8, and 1.2 ml aliquots from step 2 on linear graph paper. Draw the best straight line through these four points. This is the standard calibration curve.

Determination of sodium Hydroxide

1. Pipette exactly 5 ml of plating bath into a 250 ml Erlenmeyer flask and dilute with about 125 ml of deionized water.

2. Add 20 ml of 10% Barium Chloride solution and mix well.

3. Add 2–3 drops of Phenolphthalein indicator and titrate with 1 M Hydrochloric Acid solution until the red color disappears.

4. Calculate the sodium hydroxide concentration:

Sodium hydroxide (oz/gal)=ml of 1 M HCl required×1.06

Sodium hydroxide (g/l)=ml of 1 M HCl required×8.0

Hull Cell Testing

Processing problems can often be prevented if Hull Cell tests are performed on a regular basis. A steel cathode panel plated at 2 amps for 10 minutes will indicate efficiency problems, brightness problems and possible contamination by copper or chrome. A steel cathode panel plated at 0.5 amps for 10 minutes will show low current density problems.

Phosphate Process:

The phosphating process essentially involves the attachment of phosphate crystals to the Zinc-Iron substrate as formed according to the various above-described procedures. It is contemplated that a PPG IRCO BOND Z24 Heavy Phosphate solution is preferably used to form a reactive microscopic layer to the Zinc-Iron substrate. IRCO BOND Z24 is a moderately heavy zinc phosphate coating, typically ranging between 1500–2200 mg/ft$^2$. in coating weight. IRCO BOND Z-24 tends to develop a more fine-grained phosphate coating than standard heavy zinc phosphate. Certain product advantages center on the fact that IRCO BOND Z-24 provides a moderately heavy; fine grain coating for a smoother coating for less dimensional change. It is internally accelerated, making a single package for ease of operation and control. Its intermediate range coating weight makes IRCO BOND Z-24 a very versatile zinc phosphate product that assists in promoting sealer adhesion.

| TECHNICAL PROPERTIES | |
|---|---|
| Composition: | Liquid |
| Appearance: | Clear colorless |
| Odor: | Mild sweet |
| Specific Gravity @ 60° F.: | 1.508 |
| Pound per Gallon: | 12.58 |
| Flash Point: | None |
| Foaming Tendency: | Low |
| Recommended Diluent: | Water |
| Behavior in Hard Water: | Good |
| Rinsability: | Good |
| Biodegradable Surfactants: | N/A |
| Recommended Concentration: | 4%–5% by volume |
| Recommended Temperatures: | 165° F.–175° F. |
| pH (concentrate): | 1.5 |
| pH (working solution): | 2.5 @ 4% by volume |
| OPERATING PROPERTIES: | |
| Operating Concentration: | 4%–5% vol. |
| Operating Analysis: | 24–30 points (Effective Total Acid) Dependent on system |
| Operating Temperature: | 165° F.–175° F. |
| Coating or Immersion Time: | 15–30 minutes |

Typical Operating Data:

Bath Preparation: For each 100 US gallons of bath to be prepared, add 4 gallons of IRCO BOND Z-24. Mix well and analyze for concentration.

Operational Controls:

| | |
|---|---|
| Total Acid 1: | 24–30 points |
| Free Acid 1: | 6.5–6.6 |
| Temperature: | 165° F.–175° F. (opt) |
| Contact Time | 15–30 min (opt) |

It should be noted that the described values are for initial make-up. The values will increase as iron builds in the bath.

Details of Bath Preparation: (per 100 Gallons)

(1) Fill the clean tank to approximately ¾ of the operating volume with fresh water.

(2) Make up in cold water.

(3) Slowly add 4 gallons of IRCO BOND Z-24 for every 100 gallons of bath.

(4) Mix well and continue filling the tank to the operating level with fresh water.

(5) Steel wool or scrape parts should be rotated in a barrel while heating.

(6) Heat to 150° F.–160° F. and analyzes.

(7) Make any concentration adjustments required and begin processing parts.

Bath Controls:

Total Acid and Iron titrations control the IRCO BOND Z-24 bath. As the bath is operated, the dissolved iron content will slowly increase, and the Total Acid will also be increased to maintain iron solubility.

(A) Total Acid (1) Pipette a 10-ml sample of the bath into a 150-ml Erlenmeyer flask.

(2) Add 10 drops Phenolphthalein (N-10) and swirl the sample to mix.

(3) Slowly add 0.1N NaOH (T-1) through burette, while swirling the sample to mix.

(4) The end-point of the titration is reached when sample turns from colorless to pink, and remains pink for 15–30 seconds.

(5) Each ml of 0.1N NaOH (T-1) is recorded as one (1) point of Total Acid.

(6) Adjust the IRCO BOND metering pump up or down to maintain Total Acid within the specified range.

(B) Free Acid (1) Pipette a 10 ml sample of the bath into a 150-ml Erlenmeyer flask.

(2) Add 3–5 drops of modified methyl orange (N-11) and swirl to mix. The sample will turn purple.

(3) Slowly add 0.1N NaOH (T-1) through a burette while swirling the sample to mix.

(4) The end-point of the titration is reached when the sample turns green.

(5) Each ml of 0.1N NaOH (T-1) is recorded as one (1) point of Free Acid.

(C) Iron (1) Pipette a 10 ml sample of the bath into a 150 ml Erlenmeyer flask.

(2) Add 10 drops of a (50/50) mixture of Phosphoric Acid/Sulfuric Acid (N-14) and swirl the sample to mix.

(3) Slowly add 0.2N Potassium Permanganate (T-4) through a burette while swirling the sample.

(4) The end-point is reached when the sample turns pink-to-red, and remains pink for 15–30 seconds.

(5) Each ml of 0.2N KMn04 (T-4) is recorded as one (1) point of iron in solution.

(6) Adjust the IRCO BOND metering pump up or down to maintain the concentration of the following iron control formula.

Iron Control Formula:

The iron control formula is a means of controlling the concentration of the phosphate bath at 24–30 points of Effective Total Acid. The formula increases the Total Acid of the bath 3.5 points for every point of dissolved iron in the bath. The iron control formula may be summarized as follows: Effective Total Acid=Total Acid−[3.5×Fe (g/l)]. At any time the iron is high enough to result in low Effective Total Acid (ETA), more IRCO BOND should be added.

Phosphating Plating Bath Alternatives:

Examples of alternative phosphate solutions are: Deveco Dev-Kote 720—Heavy Zinc Phosphate solution, 4% PPG 51800 Phosphate Solution. or CrysCoat MP Zinc Phosphate.

The (Zinc-Iron)-Phosphate layer is then sealed using a Non-Chrome Sealer. Examples of the non-chrome sealers: IR 1478-2X, or Gardonbond D 6800. The process for the Gardonbond D 6800 may be summarized as follows:

Concentration: 0.13% by volume Gardonbond D 6800
Temperature: 60–100° F.
The pH is controlled to: 3.6–4.0
The conductivity is controlled to: 500 μMhos/cm max.
Bath Renewal: Once monthly or at 500 μMhos/cm.
Rinse: 3 gallons per minute single station tap water rinse (ambient temperature).

It should be noted that a "test coupon" must be added to the bath to determine total weight of the zinc-iron substrate, and to calculate the coating weight of phosphate. The standard that governs the "test coupon" process is: ASTM Standard B 767. The Standard Guide for Determining Mass Per Unit Area of Electrodeposited and Related Coatings by Gravimetric and Other Chemical Analysis Procedures. Other standards include: MIL C-16232. During the phosphating process it is important that one does not clean the parts using caustic or acid cleaners. The final weight minus this initial weight will determine the Phosphate Coating Weight. The final weight must be greater than the initial weight. Due to the nature of this type process all phosphated parts shall be tested and evaluated in accordance with SAE/USCAR-1. This standard outlines the conditions that enhance the risk of hydrogen embrittlement of steel and define the relief procedures required to minimize the risk of hydrogen embrittlement. It is intended to control the process.

Flourocarbon Sealer Process

It should be noted prefatorily that the adhesion of the fluorocarbon layer to the (Zinc-Iron)Phosphate substrate is governed by the ASTM Standard B571, and General Motors Standard: GM9071P. In the preferred embodiment, a Xylan 5230 sealer is cured to the (Zinc-Iron-Phosphate crystal) substrate. Xylan is an organic coating formulated to give good corrosion resistance with controlled torque-tension characteristics. It contains P.T.F.E. that is perhaps the most hard-wearing and toughest member of the fluorocarbon family, and a resin polymer binder, the function of the latter being to aid adhesion to the substrate and to promote corrosion resistance.

Polytetrafluoroethylene (PTFE) resin is in a class of paraffinic polymers that have some or all of the hydrogen replaced by fluoride. The original PTFE resin was invented by DuPont in 1938 and called Teflon®. PTFE is a completely fluorinated polymer manufactured by free radical polymerization of tetrafluoroethylene. With a linear molecular structure of repeating—CF-CF2-units, PTFE is a crystalline polymer with a melting point of about 621F (327C). Density is 2.13 to 2.19 g. PTFE has exceptional resistance to chemicals. Its dielectric constant (2.1) and loss factor are low and stable across wide temperature and frequency range. PTFE has useful mechanical properties from cryogenic temperatures at 500° F. (280° C.) continuous service temperatures. Its coefficient of friction is lower than almost any other material. It also has a high oxygen level. Thus, PTFE is a saturated, aliphatic fluoride-carbon compound which has high thermal and chemical stability. The mechanical-physical properties of PTFE, e.g. compressive strength, abrasion resistance and thermal expansion, can be further improved with the use of additives, or fillers. Modified PTFE materials are characterized by high shape stability, excellent sliding properties and improved abrasion resistance.

Xylan is available in a number of colors, black and blue being usually supplied. The standard Xylan 5230 has a torque-tension relationship which conforms to Ford spec. SZ600A and WZ100, RES 30 FP 105, and BS 7371 Pt. II. (The fluorocarbon, PTFE, used in this premise is a PPG Fluorocarbon: Xylan 5230/D2046 Black. Xylan® is the trademark of Whitford Plastics Ltd. Product Information: Xylan 5230/D2046 Grey/Black). The Xylan/Teflon fluorocarbon sealer coating layer shall hereinafter be referred to as the preferred or "first" select fluorocarbon layer. Thus, any reference to the first select fluorocarbon layer should be considered defined by the foregoing descriptions.

The preferred fluorocarbon sealer process is a two-dip, basket or barrel spin process. Setup is as follows:

General Description

Xylan 5230/D2046 Gray Black is a "chrome-free" fastener coating material developed for the worldwide automotive market. It is a resin-bonded, thermally-cured fluoropolymer coating. Xylan 5230 is formulated for application to fasteners by dip/spin or hand-spray method. Its primary function is to facilitate uniform driving torque while providing corrosion resistance.

Substrate Information

Xylan 5230 can be applied to many types of substrate materials such as aluminum, brass, high-alloy steel, carbon steel, stainless steel, titanium, zinc plating and zinc phosphate.

Corrosion Resistance

Xylan 5230 is typically applied in two coats (0.6 mil) over zinc-phosphated carbon steel exceeds 336 hours in ASTM B117. With three coats, it is not uncommon for testing to run 600+ hours.

Physical Properties

| | |
|---|---|
| Pencil hardness | 2–4 H |
| Dielectric strength | 500 V/mil |
| VOC content/series avg. | 4.47 lbs/gal 360 gms/l) |
| Gloss | low |
| UV resistance | fair |

Use Temperature

Xylan 5230 can be used continuously from −70° F. to +350° F. and can survive up to +425° F. intermittently. Notably, few fluid lubricants are recommended for use at cryogenic temperatures (most become solid), or above 205° C./400° F. (they oxidize rapidly). Most Xylan dry-lubricant coatings, however operate comfortably at both extremes.

Chemical Resistance

Xylan 5230 is resistant to most automotive fuels, lubricants and fluids. It has excellent resistance to acids and alkalines.

Applicable Specifications

Xylan 5230 is an approved coating material for the following specifications:

Daimler/Chrysler Corporation: PS-7001

Ford Motor Company:

WSD M21 P10 B2 (S303);

WSD M21 P10 B3 (S306)

General Motors: 6046M

Performance Characteristics

Meets SAE/USCAR 1 (336+ hours)

Self-lubricated

WZ100—"K" factor 0.17±0.02 @ 28.3 kN

Thickness—16–20 microns

Dry-to-touch

Chemical-resistant

Low risk for hydrogen embrittlement

Advantages

Integral friction modification

Plastic-compatible

Cr+6 free

Compatible with thread adhesives and sealants.

Globally accepted

Controlled applicator base

Product Specifications:

| | | |
|---|---|---|
| Solids | 57.60 +/− 2% by wt. | 41.40 +/− 2% by vol. |
| Density | 10.42 +/− 0.20 lb/gal | 1.25 +/− 0.02 Kg/liter |
| Coverage | 663.7 sq. ft./gal. at 1 mil | 13.05 sq. m./Kg at 25 μm |

Viscosity: 25–35 seconds ZAHN #3 (S90) CUP @ 77° F. (25° C.)

Typical Properties:

| | | |
|---|---|---|
| Flash Point: | 57° F. | 14° C. |
| Volatile Organic Compounds | 4342 lb/gal | 530.40 grams/liter |

After the application of the Zinc-Iron-Phosphate layer as described earlier, the coating material is prepared. In this regard, the coating material is prepared by mixing containers thoroughly by shaking or stirring until any solid material on the bottom has been eliminated. Best results are obtained when the coating temperature is 65–90° F. (18–32° C.). Adjust viscosity, if necessary, using the recommended thinner and an accurate ZAHN Viscosity Cup. Start with the highest viscosity and reduce in increments of 2 seconds to obtain good appearance and freedom from retained paint in recesses and threads. Viscosity that is too low may lead to rapid settling and low applied film thickness. Mix the Xylan 5230/D2046 while in use and check viscosity periodically to maintain in proper range.

Application Viscosity:

22–40 seconds in ZAHN # 2 (S90) CUP @ 65–90° F. (18–32° C.).

This depends on the load size and shape of parts. For parts having a small recess the viscosity should be kept to its lowest time through the ZAHN #2 cup to avoid recess fills.

Viscosity Adjustment:

MEK or PMA (Adjust viscosity to suit the type of part to be coated). Mix the Xylan 5230/D2046 while in use and check viscosity periodically to maintain in proper range.

Application Information:

The Xylan 5230/D2046 product is designed for bulk (dip/spin) application. The bulk (dip/spin) application is a multi-step operation. Two to four coats must be applied for good appearance and corrosion resistance. Typical application conditions may be summarized as follows:

1. Load Size: The load should leave an open area in the center equal to ½ the basket diameter after spinning.

2. Dip Time: 8±4 seconds (depends upon coating viscosity and part geometry.

3. Spin Time: 10–20 seconds in each direction.

Recommended:

i. 13 seconds clockwise spin, and ii. 13 seconds counter clockwise spin, and iii. 13 seconds clockwise spin 4. Spin RPM: Depends on basket size, usually 350 rpm for 24 inches (61 cm) basket to 600 rpm for 10 inches (25 cm) basket. It is important to note that to reduce and possibly prevent Fluorocarbon buildup in Torx, Philips, or Pozi-Drive recesses on fasteners a Tilt-Basket, 45 degree spin technology may be implemented. The above spin rotations may be modified using a 13 second, clockwise spin, 45 degree basket angle. This process, along with a 25 second viscosity can virtually eliminate any type of recess buildup on small fasteners.

The typical film thickness per coat ranges from 0.2–0.3 Mil (5–7.5 microns). The recommended number of coats is 2–3 coats. Recommended clean up solvents include MEK, PMA, or MEK/XYLENE: (1:1 mixture). When curing the coating, it is important to make sure that the substrate reaches the recommended bake temperature for the required time, curing and cooling between each coat. The bake schedule comprises minutes at 425° F. (219° C.). Each coat must be cured before application of next coat. When applying multiple coats to a part, the first and intermediate coats should be flashed (but not fully cured) prior to the application of subsequent coats. This increases the bond between each layer and results in a stronger, denser coating. The coating can be evaluated according to the following specifications: (1) a pencil hardness of 2–4 H with low gloss; (2) a successful cure test of 50+ firm rubs with MEK soaked cloth (there should be no effect from the MEK); and (3) adhesion: 1.00 mm cross hatch and tape with no adhesion loss and good knife scratch resistance.

Other Application Porperties:

Use Temperature:

1. 175° C. continuous operating environment.
2. 200° C. intermittent operating environment.
3. Good resistance to Alkali and Detergents
4. Fair resistance to Ultraviolet Fluorocarbon Sealer Process Alternative No. 1:

As a first alternative to the above-specified fluorocarbon sealer process, an Acheson Emralon 333 high performance fluorocarbon lubricant coating may be used. Emralon 333 is one of a series of Acheson resin-bonded lubricant coatings designed to provide dry film lubrication and release properties in a variety of industrial and consumer applications. Emralon 333 is a blend of fluorocarbon lubricants in an organic resin binder and solvent system designed for applications beyond the scope of conventional fluorocarbon coatings. Its low coefficient of friction, hardness, adhesion, resiliency, and cure conditions allow application of Emralon 333 in a multitude of places where pure sintered PTFE coatings are unsuitable. Coatings of Emralon 333 wear longer than pure PTFE, and offer superior chemical resistance (see data below). Emralon 333 combines the toughness of the support resin with the surface properties of pure PTFE. This superior coating material offers lifetime lubrication for heat-sensitive substrates, complex machined precision steel parts, light metals (copper, aluminum), and some non-metallic materials. Some notable advantages of this type of coating is that there is a low coefficient of friction: 0.09 (static); 0.09 (kinetic); there is one component, ready for use; it forms a clean, dry, tenacious film; there is a lower temperature cure than pure PTFE; there is longer wear life than pure PTFE; it is a thin film—0.001 to 0.0015 inches (0.025 to 0.038 mm); it is not subject to cold flow; it doesn't require primers; it is easy to apply; it can be overcoated; and it resists chemicals, corrosion, humidity and abrasion. The Acheson Emralon 333 high performance fluorocarbon lubricant coating as heretofore described shall hereinafter be referred to as the second select fluorocarbon layer. Thus, any reference to the second select fluorocarbon sealer layer should be considered defined by the foregoing descriptions.

Typical Properties May be Summarized as Follows:

Color: black (as cured) Coefficient of friction: 0.09 (static); 0.09 (kinetic)

Service temperature-continuous: 400°–450° F. (204°–232° C.)

Service temperature-intermittent: 500° F. (260° C.)

ASTM D968-51 Sand Abrasion Test: 21 liters/mil

Hartman Wear Test*: 200,000 cycles (180 lb test load)

Taber Abrasion Test*: weight loss, 16.9 mg/1000 cycles

Humidity Test*: 98% humidity at 120° F. (49° C.) for 500+ hours

Salt Spray* ASTM B117-64 : 500+ hours at 5% concentration

Solvent and Chemical Resistance

| Chemical | Concentration | Resistance |
|---|---|---|
| Hydrochloric Acid | 35% | Excellent |
| Sodium Hydroxide | 50% | Very Good |
| Nitric Acid | 35% | Good |
| Sulphuric Acid | 80% | Excellent |
| Methyl Ethyl Ketone | 100% | Excellent |
| Methylene Chloride | 100% | Excellent |
| Xylene | 100% | Excellent |
| Sodium Chloride | Saturated | Excellent |

It should be noted that Emralon 333 is normally applied by spray techniques. These topcoat sealer systems are governed by specifications listed under SAE, ASTM, General Motors, Ford, Daimler-Chrysler, and Delphi Automotive. The total salt spray protection of these types of Alternative sealers on the Zinc-Iron-Phosphate system will need to be determined.

To describe the effectiveness of the disclosed corrosion-resistant finish, fifty "M8×1.25×1.680 mm TORX BALL STUDS W/DOG POINTS" were tested (average weight of fastener: 16.94 gms). The fifty "M8×1.25×1.680 mm TORX BALL STUDS W/DOG POINTS" were then zinc-iron plated whereafter the average weight of fastener was 17.219 gms. The plating thickness was measured at 0.0007"-0.0008" by eddy current methods. These fasteners were then dipped in a Z-24 Heavy Phosphate bath. Five pieces were weighed before the Z-24 phosphate application (total weight: 85.939 gms/5). The same five pieces were weighed after the Z-24 heavy phosphate application (total weight: 86.141 gins/5) From the coupon test per ASTM Standard B 767: Z-24 Phosphate over plate; film thickness: 1.31 mils, 1.40 mils, 1.25 mils (average=1.32 mils, or 33.52 microns). The fluorocarbon, PTFE, used in this design application is the PPG Fluorocarbon: Xylan 5230/D2046 Black. These fasteners were basket dipped into the Xylan, belt cured at 425° F. for 15 minutes, basket dipped again for the second coat of Xylan, and again belt cured at 425° F. for 15 minutes. The fasteners were then overmolded in an injection molding machine. The overmold consists of a Grivory GV5H (50% Glass filled) product. The operating temperature of the molding dies is 190° F. The injection molding temperature of the GV5H Material is 560–570° F. and the total cycle duration is 28 seconds.

Numerous tests were conducted on the M8 fasteners using various corrosion finishes. The majority of corrosion finishes did not pass the injection molding process of the Grivory GV5H. In each case the GV5H bonded tightly to the Ball Stud fasteners, and their corrosion finishes, preventing the swivel design from moving. In the case of the (Zinc-Iron)—Phosphate-Flourocarbon coated fasteners the GV5H did not bond to the finish, or to the fastener, and the design swivel rotated freely, and without any squeaking noise.

Salt spray testing was performed in an A2LA certified lab and tested in accordance to ASTM B-117-97 and GM4298P. The test results showed white corrosion appearing after 582 hours and red corrosion first appearing at 1518 hours.

While the above descriptions contain much specificity, this specificity should not be construed as limitations on the scope of the invention, but rather as an exemplification of the invention. For example, it is contemplated that the types of chemicals and their manufactures listed in the various method sections of this disclosure are strictly for observance only. Other chemicals may be developed by chemical suppliers, or various institutes, that may greatly increase the efficiency of this process. The chemicals may also provide for a cleaner and more environmentally friendly waste treatment, however the effect of building the proposed Zinc-Iron, Phosphate Crystal, Sealer Coat finish will be the same.

It will thus be understood that the present invention provides a black, chrome-free, multilayer, corrosion-resistant finish, the corrosion-resistant finish being designed for application to a metal substrate. It will be further understood that the corrosion-resistant finish comprises at least three layers, the three layers including: a zinc-iron substrate layer, a phosphate crystal conversion layer, and a select fluorocarbon sealer coating layer. The zinc-iron substrate layer is electroplated to the metal substrate from a select, non-cyanide, alkaline-based electroplating process. The select non-cyanide, alkaline-based electroplating process is selected from a method group or grouping consisting of a first non-cyanide, alkaline zinc-iron alloy plating method, a second non-cyanide, alkaline zinc-iron alloy plating method, and a third non-cyanide, alkaline zinc-iron alloy plating method, the first, second and third non-cyanide, alkaline zinc-iron alloy plating methods being defined hereinabove.

Optionally, the corrosion-resistant finish may comprise an additional layer, namely a zinc layer intermediate the metal substrate and the zinc-iron substrate layer so as to enhance or improve the bond between the zinc-iron substrate layer and the metal substrate. In this regard it is contemplated that the zinc-iron substrate layer may be electroplated to a select substrate, the select substrate being selected from the group consisting of either the metal substrate or the optional zinc layer. If the optional zinc layer is selected, the zinc layer is electroplated to the metal substrate for providing a stronger bond to the metal substrate for the zinc-iron substrate layer. In other words, the zinc-iron substrate layer is electroplated to the zinc layer, which zinc layer functions to enhance the bond between the zinc-iron substrate layer and the metal substrate.

It will be further understood that the phosphate crystal conversion layer is non-electrolytic in nature and formed upon the zinc-iron substrate layer using an orthophosphoric acid bath. Together, the zinc-iron substrate layer and the phosphate crystal conversion layer form a zinc-iron-phosphate-crystal substrate upon which a select sealer coating layer is placed. Notably, the select sealer coating layer is black in color and chrome-free. The select sealer coating layer coats the zinc-iron-phosphate-crystal substrate and the coated zinc-iron-phosphate-crystal layer thus forms the multilayer, corrosion-resistant finish. The select sealer coating layer is selected from a coating group or grouping consisting of a first select fluorocarbon layer, a second select fluorocarbon layer, or any number of waxes, oils, or E-coats (Electrophoretically deposited paints) as earlier specified. The first select fluorocarbon layer comprises a plurality of thermo-cured coats comprising polytetrafluoroethylene and a resin polymer binder as earlier described herein. The resin polymer binder aids in the adhesion of the fluorocarbon sealer coating layer to the zinc-iron-phosphate-crystal substrate arid further promotes corrosion resistance. The second select fluorocarbon layer comprises a blend of fluorocarbon lubricants being bound by an organic resin and solvent system.

It will be further understood that the corrosion-resistant finish of the present invention is typically applied to a clean metal substrate. Thus, it will be understood that the metal substrate is cleaned before the zinc-iron substrate layer is electroplated to the metal substrate. The cleaning process essentially comprises the steps of. (1) soaking the metal substrate in a soak chemical; (2) electro-cleaning the metal substrate; (3) initially rinsing the metal substrate with a rinse compound; (4) acid-cleaning the metal substrate; and (5) finally rinsing the metal substrate with the rinse compound all as earlier specified herein.

It will be further seen that the present invention inherently teaches a method of applying a multilayer, corrosion-resistant finish to a metal substrate, the method comprising a series of basic steps. The basic steps comprise (1) electroplating a zinc-iron substrate layer upon the metal substrate via a select non-cyanide, alkaline-based electroplating process (as earlier described and referenced) thus forming a zinc-iron-enveloped substrate; (2) bathing the zinc-iron-enveloped substrate in an orthophosphoric acid bath (the orthophosphoric acid bath forming a phosphate crystal conversion layer upon the zinc-iron-enveloped substrate); and (3) coating the zinc-iron-phosphate-crystal-enveloped substrate with a select fluorocarbon sealer coating layer (as earlier described and referenced). The method may additionally comprise the step of electroplating a zinc layer to the metal substrate before the zinc-iron substrate layer is electroplated to the metal substrate. In other words, a stronger bond can be formed intermediate the metal substrate and the zinc-iron substrate layer if a zinc layer is first applied or plated to the metal substrate.

It will thus be understood from an inspection of FIGS. 1 and 2 that a cathodic-protecting zinc-iron layer is electroplated upon an iron or an iron alloy substrate via an alkaline, non-cyanide-based deposition, whereafter the exposed portion of the zinc-iron layer is chemically converted by the phosphate conversion process to produce two forms of crystal formations, namely: $Zn_3(PO_4)2$ (Hopeite) & $Zn_2Fe(PO)_2$ (Phosphophyllite). The cooperative dual crystal formation (i.e. cooperative crystalline Hopeite-Phosphophyllite) forms a unique adhesion layer not otherwise provided by the prior art.

Accordingly, although the invention has been described by reference to a preferred embodiment, it is not intended that the novel assembly be limited thereby, but that modifications thereof are intended to be included as falling within the broad scope and spirit of the foregoing disclosure, the following claims and the appended drawings.

I claim:

1. A black, chrome-free, multilayer, corrosion-resistant finish, the corrosion-resistant finish for application to a metal substrate, the corrosion-resistant finish comprising at least three layers, the three layers including:

a zinc-iron substrate layer, the zinc-iron substrate layer being electroplated to a select substrate, the zinc-iron substrate layer being electroplated to the select substrate from a select, non-cyanide, alkaline-based electroplating process;

a phosphate crystal conversion layer, the phosphate crystal conversion layer being non-electrolytic and formed upon the zinc-iron substrate layer using an orthophosphoric acid bath, the zinc-iron substrate layer and the phosphate crystal conversion layer thus forming a zinc-iron-phosphate-crystal substrate; and a select sealer coating layer, the select sealer coating layer being black in color and chrome-free, the select sealer coating layer coating the zinc-iron-phosphate-crystal substrate, the coated zinc-iron-phosphate-crystal substrate thus forming the multilayer, corrosion-resistant finish.

2. The corrosion-resistant finish of claim 1 wherein the select non-cyanide, alkaline-based electroplating process is selected from a method group, the method group consisting of a first non-cyanide, alkaline zinc-iron alloy plating method, a second non-cyanide, alkaline zinc-iron alloy plating method, and a third non-cyanide, alkaline zinc-iron alloy plating method.

3. The corrosion-resistant finish of claim 1 wherein the select substrate is selected from the group consisting of a metal substrate and a zinc layer, the zinc layer being electroplated to the metal substrate, the zinc layer for providing a stronger bond to the metal substrate for the zinc-iron substrate layer.

4. The corrosion-resistant finish of claim 1 wherein the select sealer coating layer is selected from a coating group, the coating group consisting of a first select fluorocarbon layer and a second select fluorocarbon layer.

5. The corrosion-resistant finish of claim 4 wherein the first select layer comprises polytetrafluoroethylene and a resin polymer binder, the resin polymer binder for aiding fluorocarbon sealer coating layer adhesion to the zinc-iron-phosphate-crystal substrate and to promote corrosion resistance.

6. The corrosion-resistant finish of claim 4 wherein the second select fluorocarbon layer comprises a blend of fluorocarbon lubricants, the blend of fluorocarbon lubricants being bound by an organic resin and solvent system.

7. The corrosion-resistant finish of claim 5 wherein the first select fluorocarbon sealer layer comprises a plurality of thermo-cured coats.

8. The corrosion-resistant finish of claim 1 wherein the metal substrate is cleaned before the zinc-iron substrate layer is electroplated to the metal substrate.

9. The multilayer corrosion-resistant finish of claim 8 wherein the metal substrate is cleaned by a cleaning process, the cleaning process comprising the steps of:

a. soaking the metal substrate in a soak chemical;

b. electro-cleaning the metal substrate;

c. initially rinsing the metal substrate with a rinse compound;

d. acid-cleaning the metal substrate; and e. finally rinsing the metal substrate with the rinse compound.

10. A multilayer, corrosion-resistant finish, the corrosion-resistant finish comprising:

a zinc-iron substrate layer, the zinc-iron substrate layer for electroplated attachment to a metal substrate, the zinc-iron substrate layer being formed from a select non-cyanide, alkaline-based electroplating process;

a phosphate crystal conversion layer, the phosphate crystal conversion layer being formed upon the zinc-iron substrate layer, the zinc-iron substrate layer and the phosphate crystal conversion layer thus forming a zinc-iron-phosphate-crystal substrate; and a select sealer coating layer, the select sealer coating layer coating the zinc-iron-phosphate-crystal substrate, the coated zinc-iron-phosphate-crystal substrate thus forming the multilayer, corrosion-resistant finish.

11. The multilayer corrosion-resistant finish of claim 10 wherein the select sealer coating layer is black in color and chrome-free.

12. The multilayer corrosion-resistant finish of claim 10 wherein the select non-cyanide, alkaline-based electroplating process is selected from a method group, the method group consisting of a first non-cyanide, alkaline zinc-iron alloy plating method, a second non-cyanide, alkaline zinc-iron alloy plating method, and a third non-cyanide, alkaline zinc-iron alloy plating method.

13. The corrosion-resistant finish of claim 10 wherein the select substrate is selected from the group consisting of a metal substrate and a zinc layer, the zinc layer being electroplated to the metal substrate, the zinc layer for providing a stronger bond to the metal substrate for the zinc-iron substrate layer.

14. The multilayer corrosion-resistant finish of claim 10 wherein the select sealer coating layer is selected from a coating group, the coating group consisting of a first select fluorocarbon layer and a second select fluorocarbon layer.

15. The multilayer corrosion-resistant finish of claim 14 wherein the first select fluorocarbon layer comprises polytetrafluoroethylene and the second select fluorocarbon layer comprises a blend of fluorocarbon lubricants bound by an organic resin and solvent system.

16. The multilayer corrosion-resistant finish of claim 15 wherein the first select fluorocarbon sealer layer comprises a plurality of coats.

17. The multilayer corrosion-resistant finish of claim 10 wherein the metal substrate is cleaned before the zinc-iron substrate layer is electroplated to the metal substrate.

18. The multilayer corrosion-resistant finish of claim 17 wherein the metal substrate is cleaned by a cleaning process, the cleaning process comprising the steps of:

a. soaking the metal substrate in a soak chemical;

b. electro-cleaning the metal substrate;

c. initially rinsing the metal substrate with a rinse compound;

d. acid-cleaning the metal substrate; and e. finally rinsing the metal substrate with the rinse compound.

19. A method of applying a multilayer, corrosion-resistant finish to a metal substrate, the method comprising the steps of:

electroplating a zinc-iron substrate layer upon the metal substrate via a select non-cyanide, alkaline-based electroplating process thus forming a zinc-iron-enveloped substrate;

bathing the zinc-iron-enveloped substrate in an orthophosphoric acid bath, the orthophosphoric acid bath forming a phosphate crystal conversion layer upon the zinc-iron-enveloped substrate, the phosphate crystal conversion layer thus forming a zinc-iron-phosphate-crystal-enveloped substrate; and coating the zinc-iron-phosphate-crystal-enveloped substrate with a select sealer coating layer.

20. The method of claim 19 wherein the metal substrate is cleaned before being electroplated with the zinc-iron substrate layer.

21. The method of claim 20 wherein the metal substrate is cleaned by a cleaning process, the cleaning process comprising the steps of:

a. soaking the metal substrate in a soak chemical;

b. electro-cleaning the metal substrate;

c. initially rinsing the metal substrate with a rinse compound;

d. acid-cleaning the metal substrate; and e. finally rinsing the metal substrate with the rinse compound.

22. The method of claim 19 wherein a zinc layer is electroplated to the metal substrate before the zinc-iron substrate layer is electroplated to the metal substrate, the zinc layer for providing a stronger bond to the metal substrate for the zinc-iron substrate layer.

23. The method of claim 19 wherein the select non-cyanide, alkaline-based electroplating process is selected from a method group, the method group consisting of a first non-cyanide, alkaline zinc-iron alloy plating method, a second non-cyanide, alkaline zinc-iron alloy plating method, and a third non-cyanide, alkaline zinc-iron alloy plating method.

24. The method of claim 19 wherein the select sealer coating layer is selected from a coating group, the coating group consisting of a first select fluorocarbon layer and a second select fluorocarbon layer.

25. The method of claim 24 wherein the select fluorocarbon sealer coating layer is black in color and chrome-free.

26. The method of claim 24 wherein the first select fluorocarbon layer comprises polytetrafluoroethylene and the second select fluorocarbon layer comprises a blend of fluorocarbon lubricants bound by an organic resin and solvent system.

27. The method of claim 24 wherein the first select fluorocarbon sealer layer comprises a plurality of coats.

* * * * *